United States Patent
Wong et al.

(10) Patent No.: US 9,467,906 B2
(45) Date of Patent: Oct. 11, 2016

(54) METHOD AND APPARATUS FOR FACILITATING COMMUNICATION SESSION CONTINUITY

(75) Inventors: Curt Wong, Sammamish, WA (US); Jari Kalevi Mutikainen, Lepsämä (FI)

(73) Assignee: Nokia Technologies Oy, Espoo (FI)

( * ) Notice: Subject to any disclaimer, the term of this patent is extended or adjusted under 35 U.S.C. 154(b) by 58 days.

(21) Appl. No.: 14/374,510

(22) PCT Filed: Jan. 31, 2012

(86) PCT No.: PCT/IB2012/050456
§ 371 (c)(1),
(2), (4) Date: Jul. 24, 2014

(87) PCT Pub. No.: WO2013/114158
PCT Pub. Date: Aug. 8, 2013

(65) Prior Publication Data
US 2014/0376514 A1    Dec. 25, 2014

(51) Int. Cl.
*H04W 36/00* (2009.01)
*H04W 76/00* (2009.01)
*H04W 4/22* (2009.01)
*H04L 29/06* (2006.01)

(52) U.S. Cl.
CPC ........... *H04W 36/0022* (2013.01); *H04W 4/22* (2013.01); *H04W 36/0033* (2013.01); *H04W 36/0083* (2013.01); *H04W 76/007* (2013.01); *H04L 65/1069* (2013.01)

(58) Field of Classification Search
None
See application file for complete search history.

(56) References Cited

U.S. PATENT DOCUMENTS

| 2011/0164564 A1* | 7/2011 | Vedrine | H04W 36/0033 370/328 |
| 2013/0195076 A1* | 8/2013 | Keller et al. | 370/331 |
| 2014/0370842 A1* | 12/2014 | Abtin et al. | 455/404.2 |

FOREIGN PATENT DOCUMENTS

| WO | 2008/081310 A1 | 7/2008 |
| WO | 2010/052343 A2 | 5/2010 |
| WO | 2010/055398 A1 | 5/2010 |
| WO | 2010/091426 A1 | 8/2010 |

(Continued)

OTHER PUBLICATIONS

"3rd Generation Partnership Project; Technical Specification Group Services and System Aspects; IP Multimedia Subsystem (IMS) Emergency Sessions (Release 11)", 3GPP TS 23.167, v11.3.0, Dec. 2011, pp. 1-41.

(Continued)

*Primary Examiner* — Ashley Shivers
(74) *Attorney, Agent, or Firm* — Alston & Bird LLP

(57) ABSTRACT

A method and apparatus are provided for facilitating communication session continuity. A method may include receiving, at a terminal, an identifier associated with an EATF (emergency access transfer function). The method may further include determining that the terminal has undergone a reverse SRVCC (Single Radio Voice Call Continuity) handover from a circuit switched access to a packet switched access while engaged in an active emergency session. The method may additionally include, responsive to the determination, using the identifier to set up an emergency session transfer request to the EATF to cause creation of a bearer for the emergency session on the packet switched access. A corresponding apparatus is also provided.

20 Claims, 16 Drawing Sheets

(56) References Cited

FOREIGN PATENT DOCUMENTS

| WO | 2010/129050 A1 | 11/2010 |
|----|----------------|---------|
| WO | 2011/008566 A2 | 1/2011  |

OTHER PUBLICATIONS

"3rd Generation Partnership Project; Technical Specification Group Services and System Aspects; General Packet Radio Service (GPRS) Enhancements for Evolved Universal Terrestrial Radio Access Network (E-UTRAN) Access (Release 11)", 3GPP TS 23.401, v11.0.0, Dec. 2011, pp. 1-287.

"3rd Generation Partnership Project; Technical Specification Group Core Network and Terminals; Mobile Radio Interface Layer 3 Specification; Core Network Protocols; Stage 3 (Release 11)", 3GPP TS 24.008, v11.0.0, Sep. 2011, pp. 1-645.

"3rd Generation Partnership Project; Technical Specification Group Services and System Aspects; Feasibility Study on Voice Call Continuity Support for Emergency Calls (Release 9)", 3GPP TR 23.826, v9.0.0, Mar. 2009, pp. 1-82.

"3rd Generation Partnership Project; Technical Specification Group Services and System Aspects; Single Radio Voice Call Continuity (SRVCC); Stage 2 (Release 11)", 3GPP TS 23.216, v11.3.0, Dec. 2011, pp. 1-59.

"3rd Generation Partnership Project; Technical Specification Group Services and System Aspects; Feasibility Study of Single Radio Voice Call Continuity (SRVCC) From UTRAN/GERAN to E-UTRAN/HSPA; Stage 2 (Release 11)", 3GPP TR 23.885, v11.0.0, Sep. 2011, pp. 1-83.

"3rd Generation Partnership Project; Technical Specification Group Services and System Aspects; IP Multimedia Subsystem (IMS) Service Continuity; Stage 2 (Release 11)", 3GPP TS 23.237, v11. 3.0, Dec. 2011, pp. 1-161.

International Search Report and Written Opinion received for corresponding Patent Cooperation Treaty Application No. PCT/IB2012/050456, dated Feb. 1, 2013, 21 pages.

\* cited by examiner

METHOD AND APPARATUS FOR FACILITATING COMMUNICATION SESSION CONTINUITY

RELATED APPLICATION

This application was originally filed as PCT Application No. PCT/IB2012/050456 filed on Jan. 31, 2012.

TECHNOLOGICAL FIELD

Embodiments of the present invention relate generally to communication technology and, more particularly, relate to methods, apparatuses, and computer program products for facilitating communication session continuity.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, telecommunication industry service providers are developing improvements to existing networks. For example, Long Term Evolution (LTE) networks, including LTE and LTE-Advanced (LTE-A) networks, are currently being developed. LTE technology is aimed at upgrading prior technologies by improving efficiency, lowering costs, improving services, making use of new spectrum opportunities, and providing better integration with other open standards.

However, as these new networking technologies, which may comprise packet switched networks (e.g., an IP Multimedia Subsystem (IMS) capable network) are deployed, coverage by the new networking technology may not be universal. Accordingly, due to mobility of user equipment (UE), a UE may have to be handed over between a network access using packet switched technology, such as an LTE network, to a network access using legacy circuit switched technology, such as legacy second generation (2G) and third generation (3G) networks. Thus, in order to assure quality of service and avoid dropping ongoing communication sessions during handovers between network access technologies, the new networking technologies may have to coexist with legacy circuit switched networking technologies.

BRIEF SUMMARY

A system, method, and apparatus are herein provided for facilitating communication session continuity. Systems, methods, and apparatuses in accordance with various embodiments may provide several advantages to computing devices, computing device users, communications networks, network operators, service providers, first responders, and consumers. For example, some example embodiments facilitate communication session continuity of an emergency communication session that may be active during a handover of a terminal from a circuit switched access to a packet switched access. In this regard, some example embodiments facilitate communication session continuity for an active emergency session during a reverse single radio voice call continuity (SRVCC) handover of a terminal from a circuit switched access to a packet switched access. Such example embodiments may be quite beneficial, as no standard yet exists to support continuity of an emergency session in the context of a reverse SRVCC handover of a terminal from a circuit switched access to a packet switched access.

In a first example embodiment, a method is provided, which may comprise receiving, at a terminal, an identifier associated with an EATF (emergency access transfer function). The method of this example embodiment may further comprise determining that the terminal has undergone a reverse SRVCC (Single Radio Voice Call Continuity) handover from a circuit switched access to a packet switched access while engaged in an active emergency session. The method of this example embodiment may additionally comprise, responsive to the determination, using the identifier to set up an emergency session transfer request to the EATF to cause creation of a bearer for the emergency session on the packet switched access.

In a second example embodiment, an apparatus comprising at least one processor and at least one memory storing computer program code is provided. The at least one memory and stored computer program code may be configured, with the at least one processor, to cause the apparatus of this example embodiment to at least receive, at a terminal, an identifier associated with an EATF. The at least one memory and stored computer program code may be configured, with the at least one processor, to further cause the apparatus of this example embodiment to determine that the terminal has undergone a reverse SRVCC handover from a circuit switched access to a packet switched access while engaged in an active emergency session. The at least one memory and stored computer program code may be configured, with the at least one processor, to additionally cause the apparatus of this example embodiment, responsive to the determination, to use the identifier to set up an emergency session transfer request to the EATF to cause creation of a bearer for the emergency session on the packet switched access.

In a third example embodiment, an apparatus is provided that may comprise means for receiving, at a terminal, an identifier associated with an EATF. The apparatus of this example embodiment may further comprise means for determining that the terminal has undergone a reverse SRVCC handover from a circuit switched access to a packet switched access while engaged in an active emergency session. The apparatus of this example embodiment may additionally comprise means for, responsive to the determination, using the identifier to set up an emergency session transfer request to the EATF to cause creation of a bearer for the emergency session on the packet switched access.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWINGS

Figure 1:
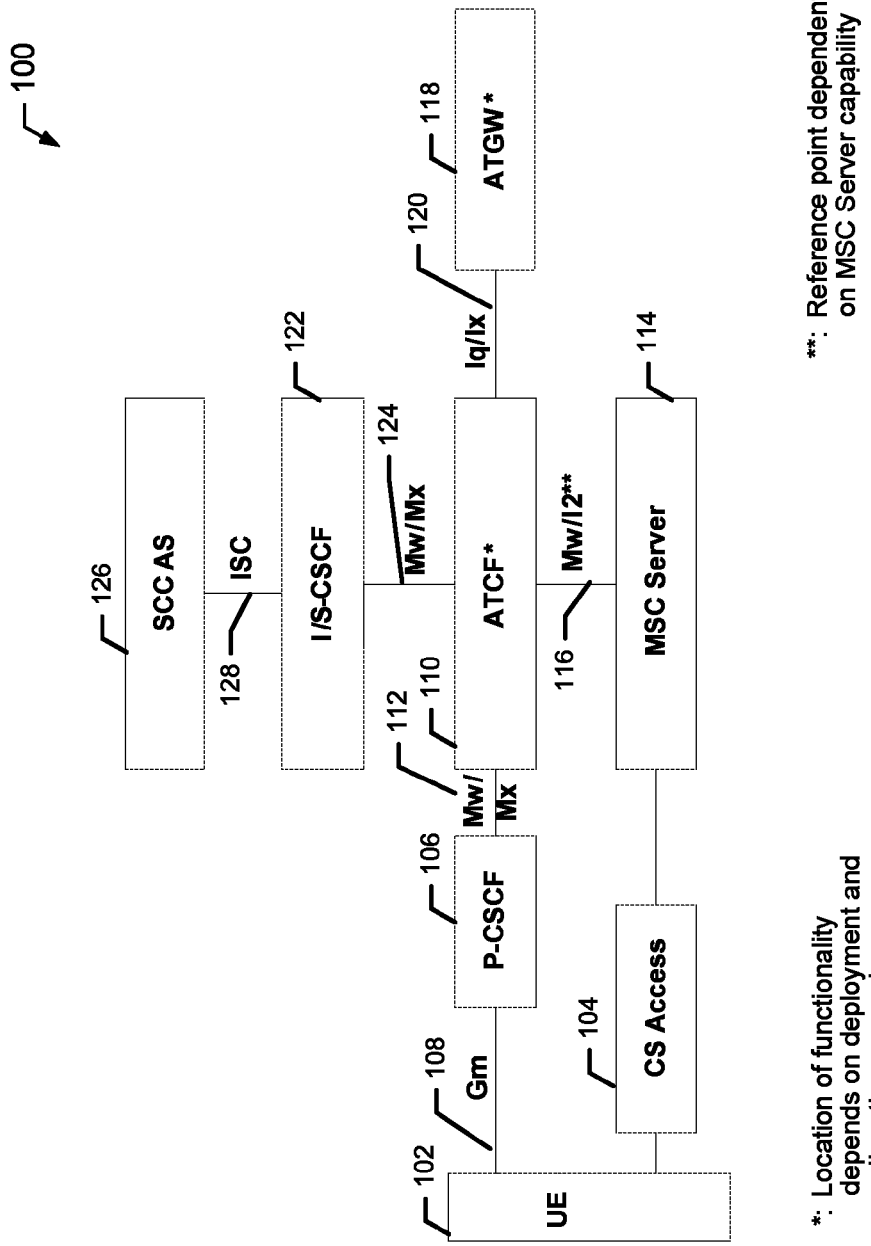
Figure 2:
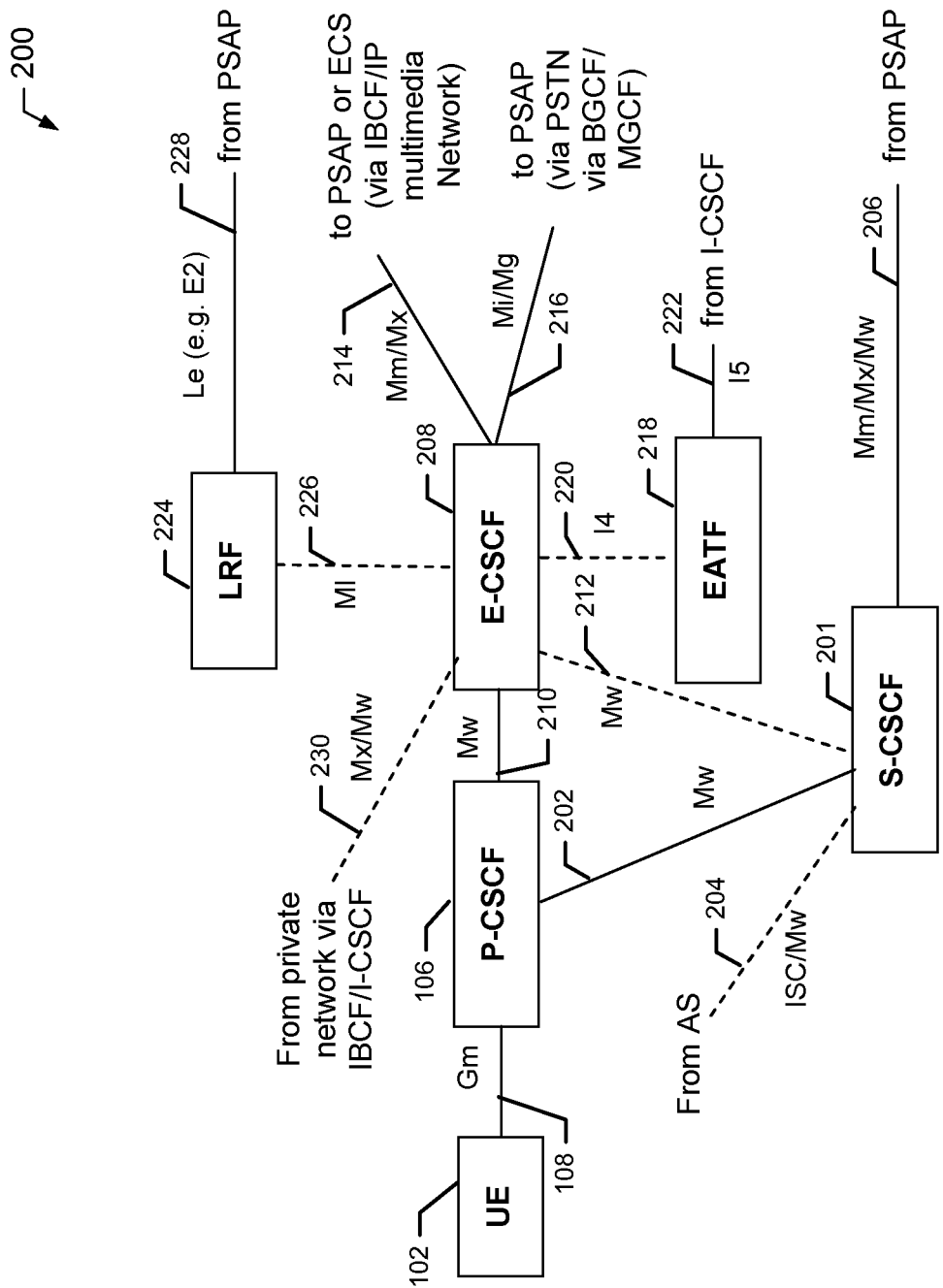
Figure 3:
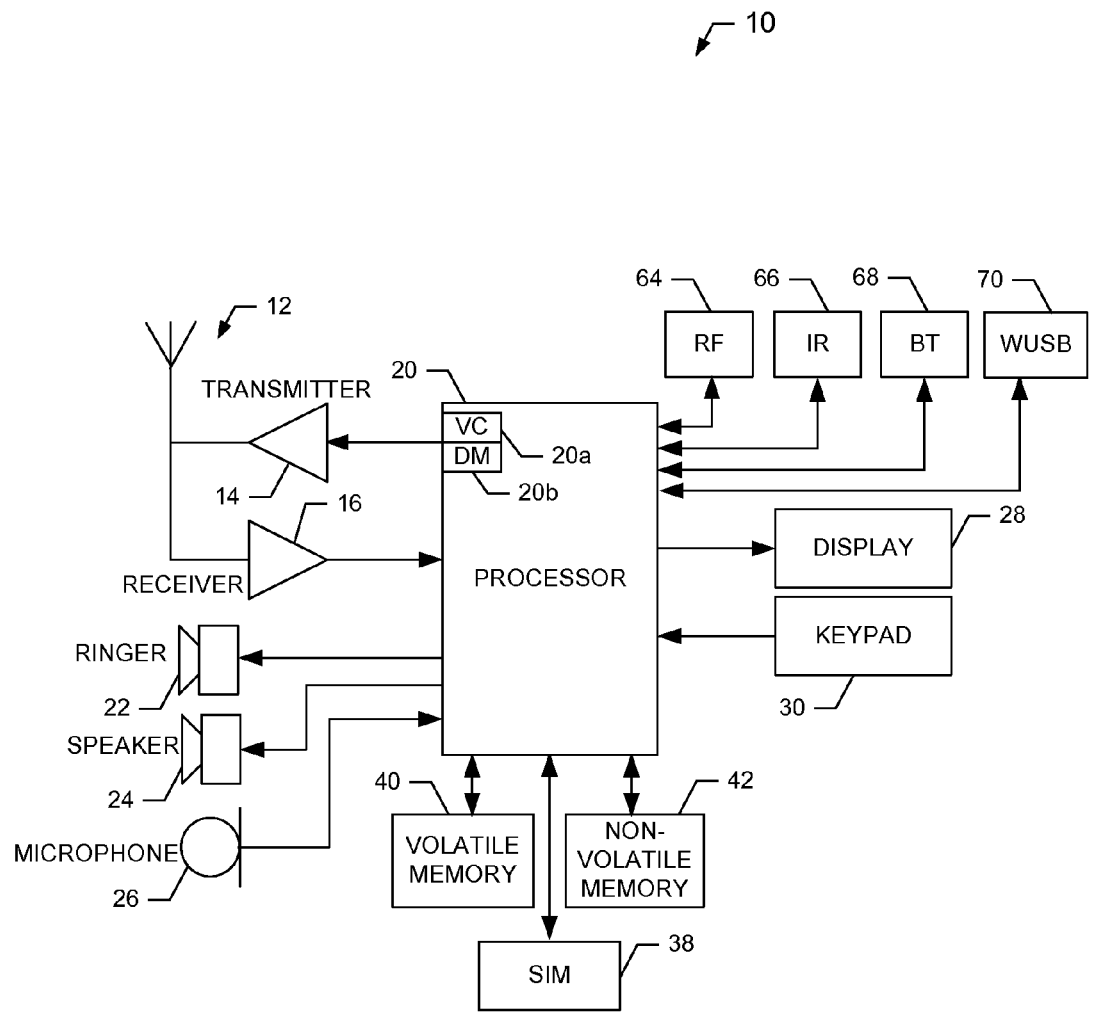
Figure 4:
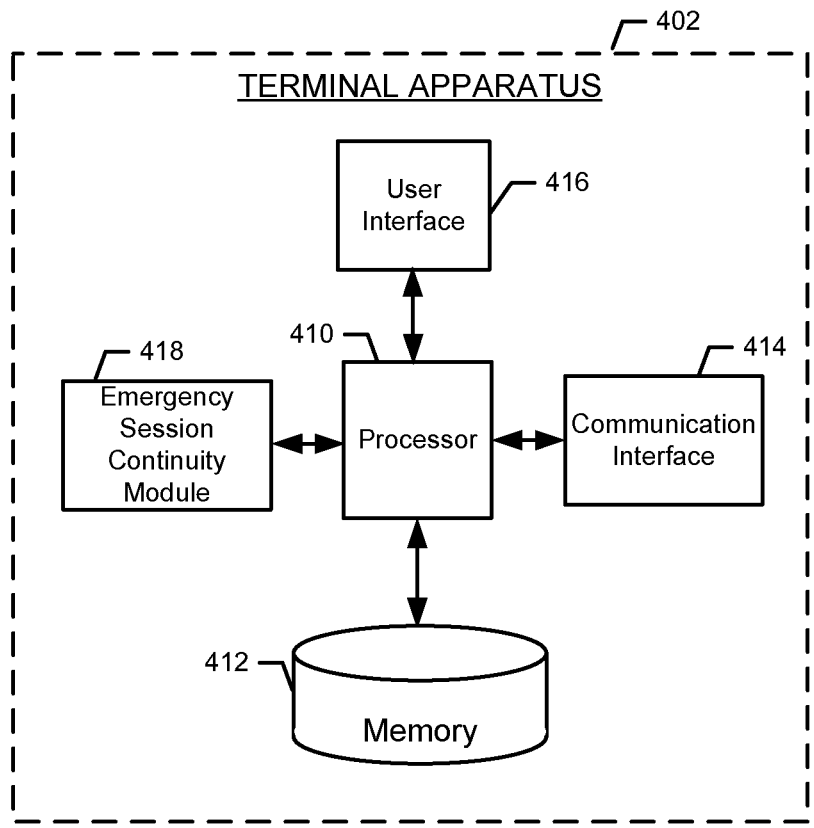
Figure 5:
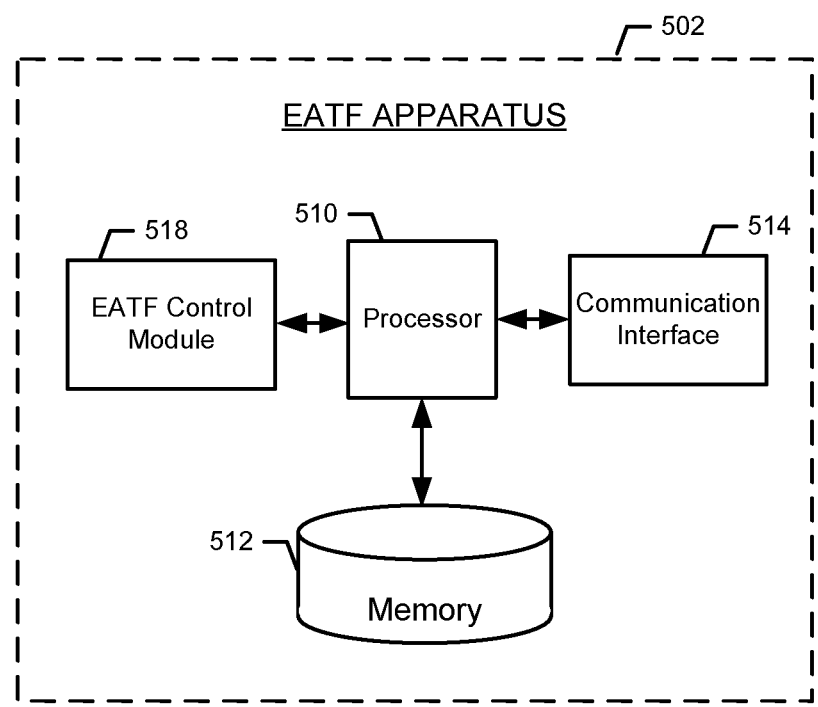
Figure 6:
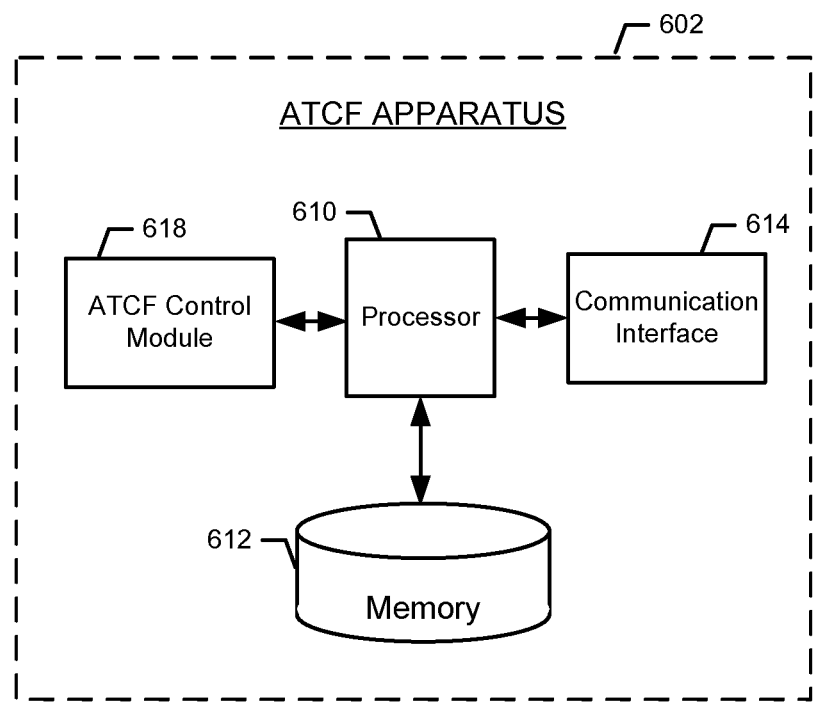
Figure 7:
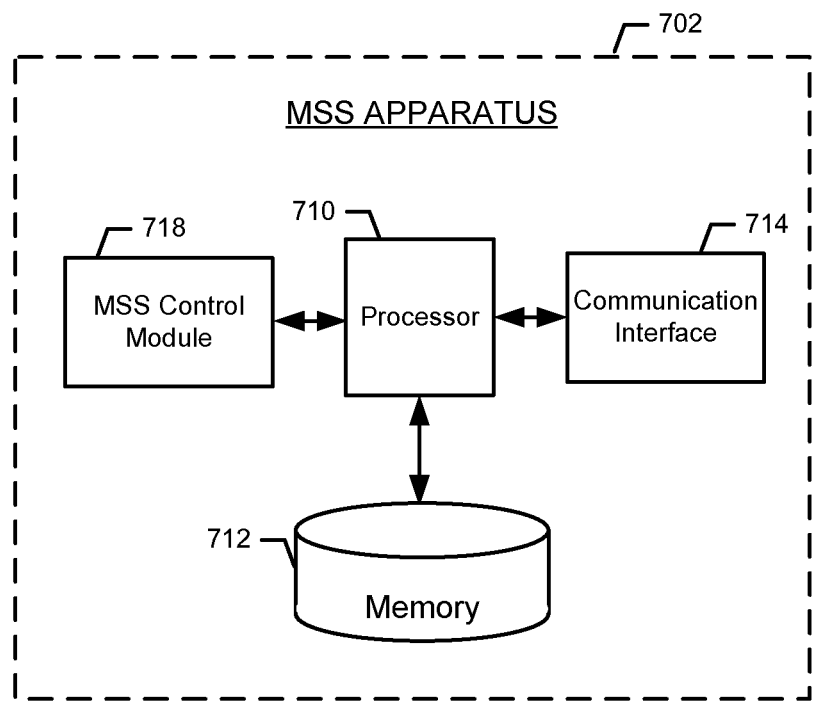
Figure 8:
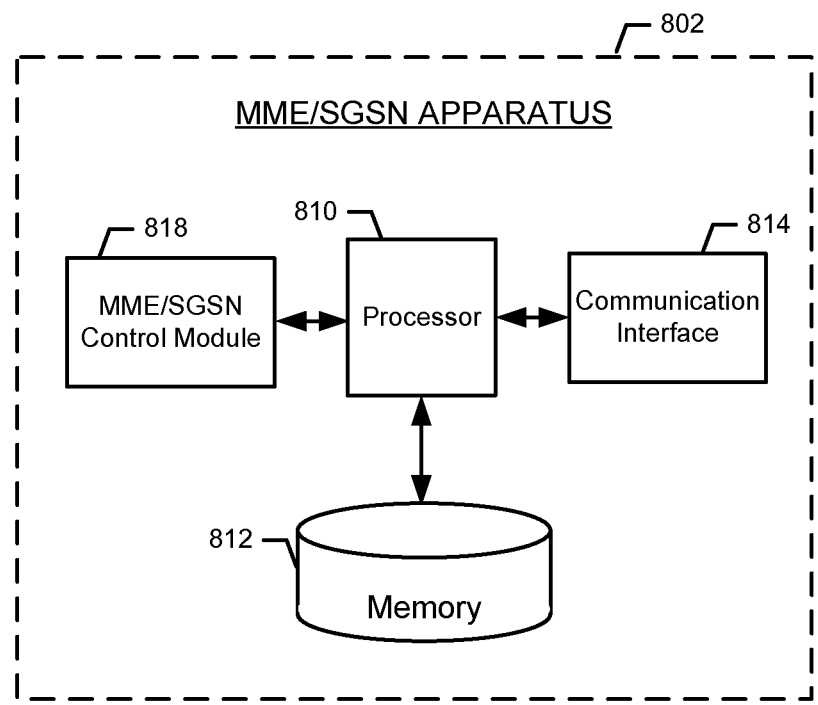
Figure 9:
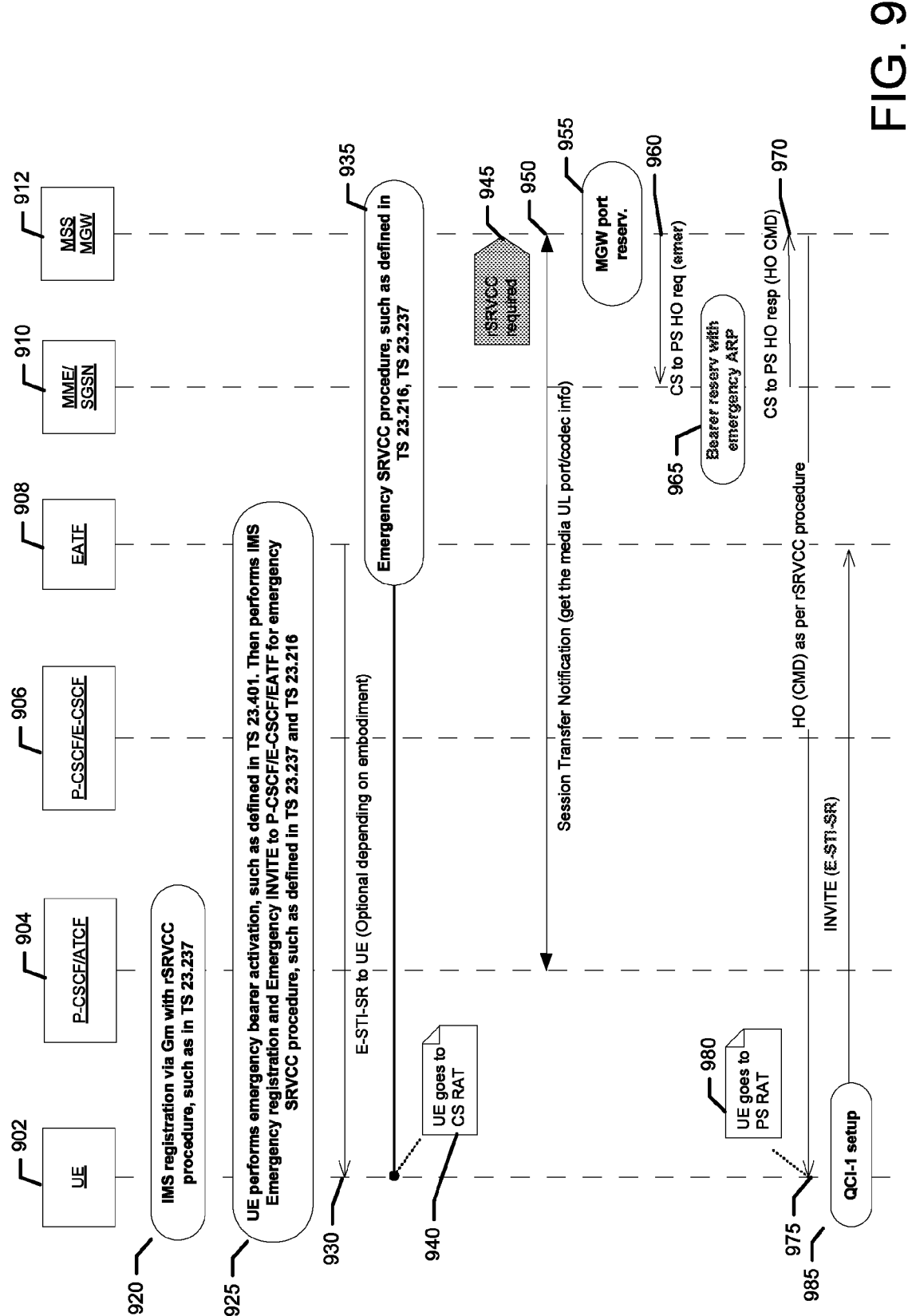
Figure 10:
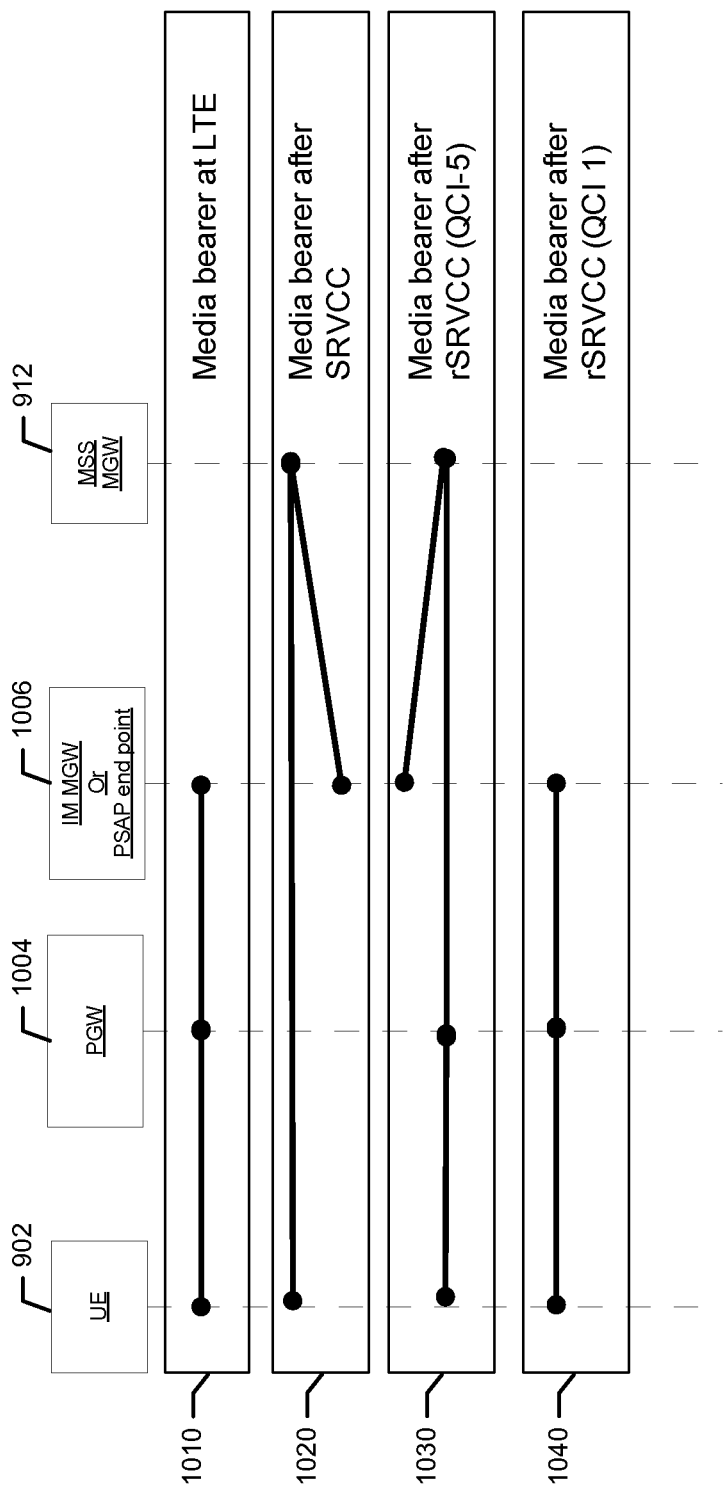
Figure 11:
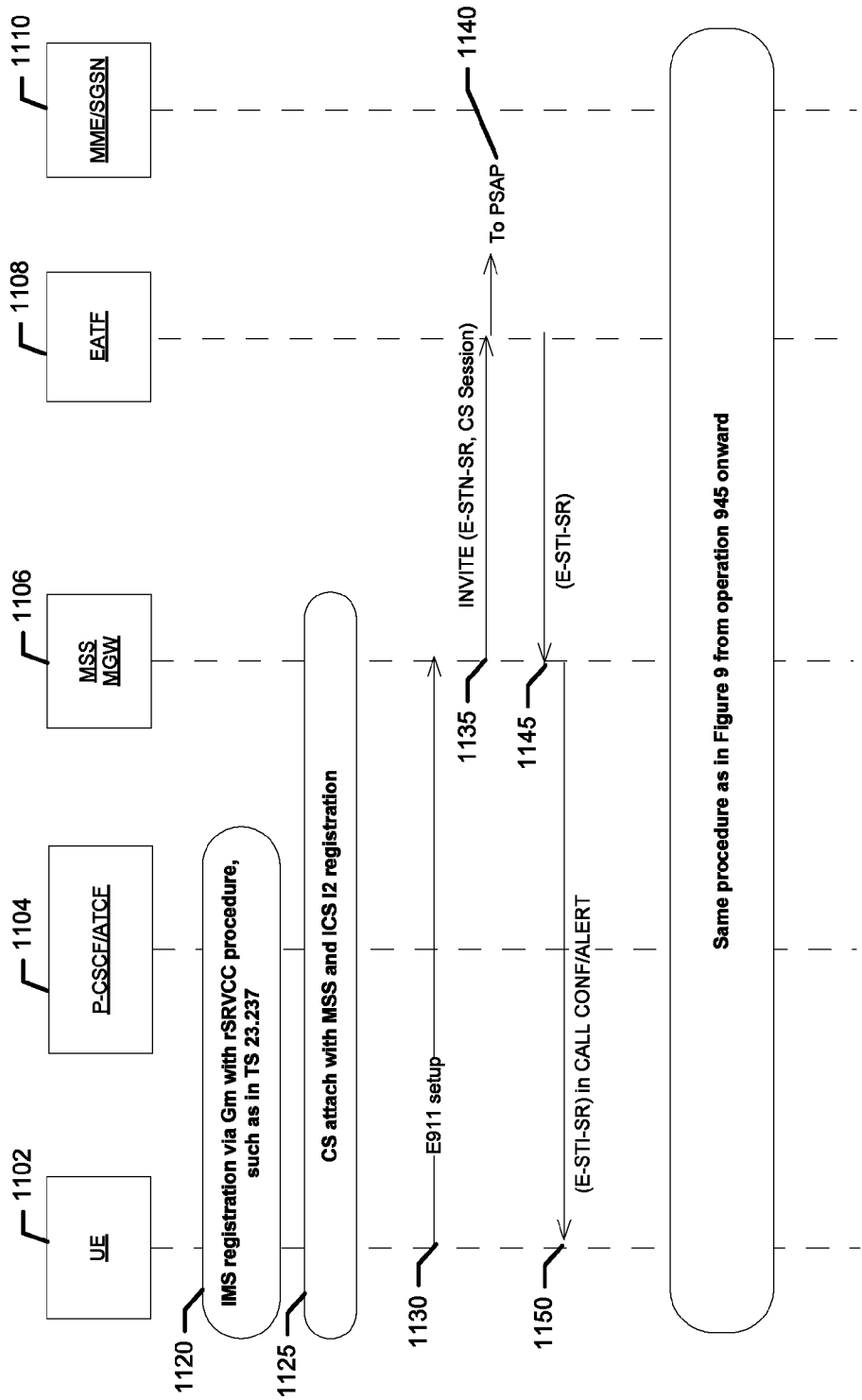
Figure 12:
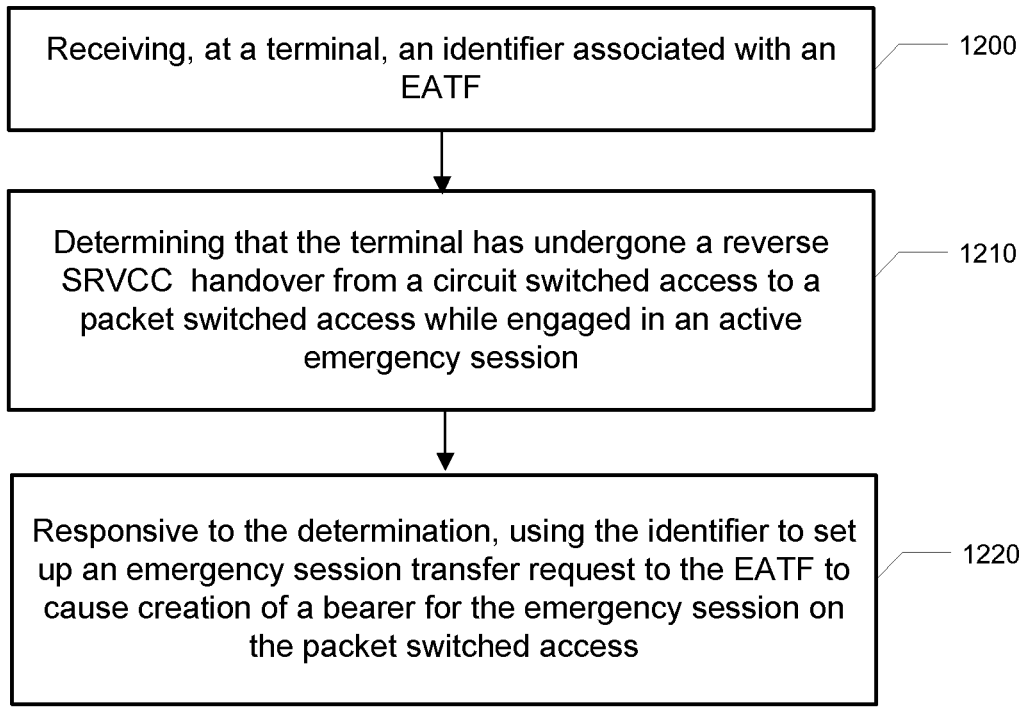
Figure 13:
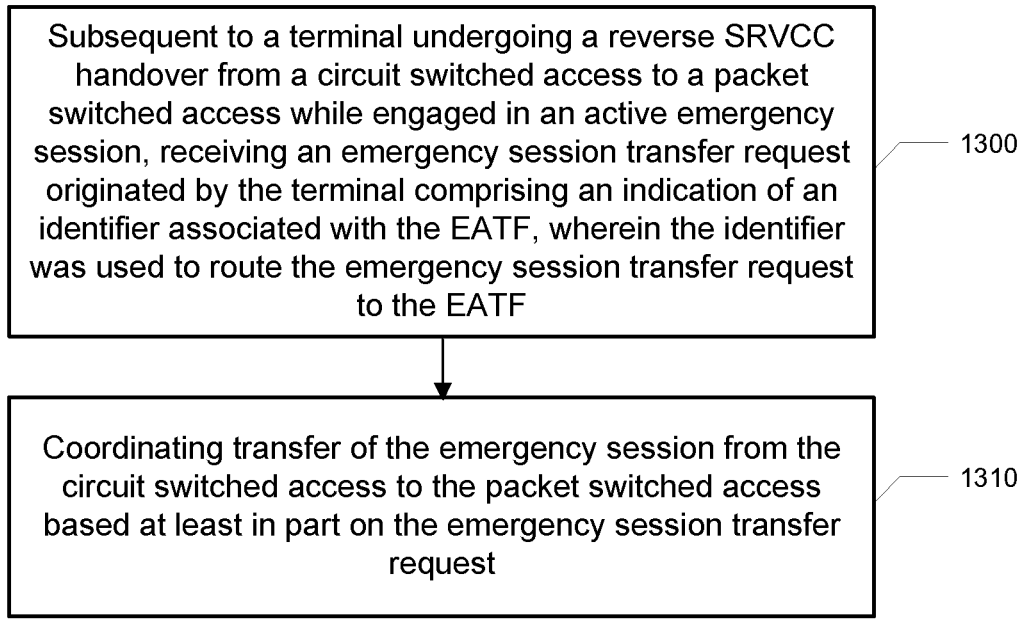
Figure 14:
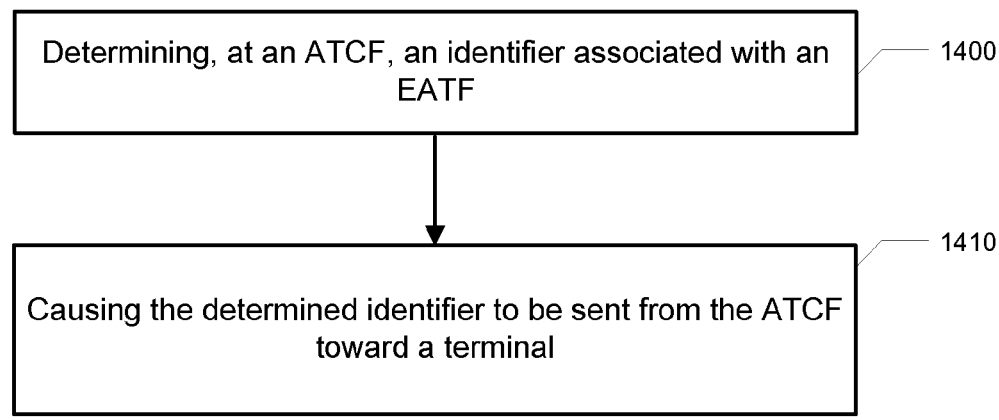
Figure 15:
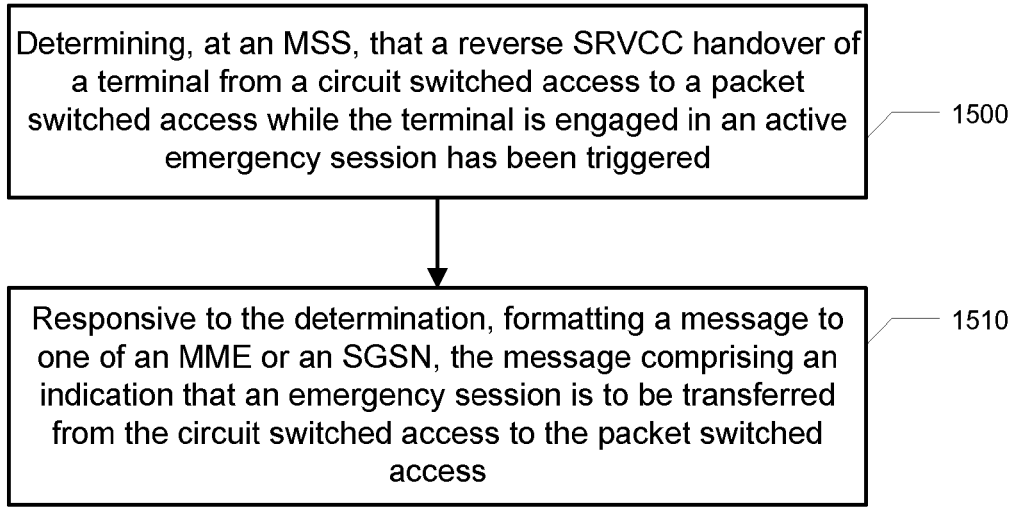
Figure 16:
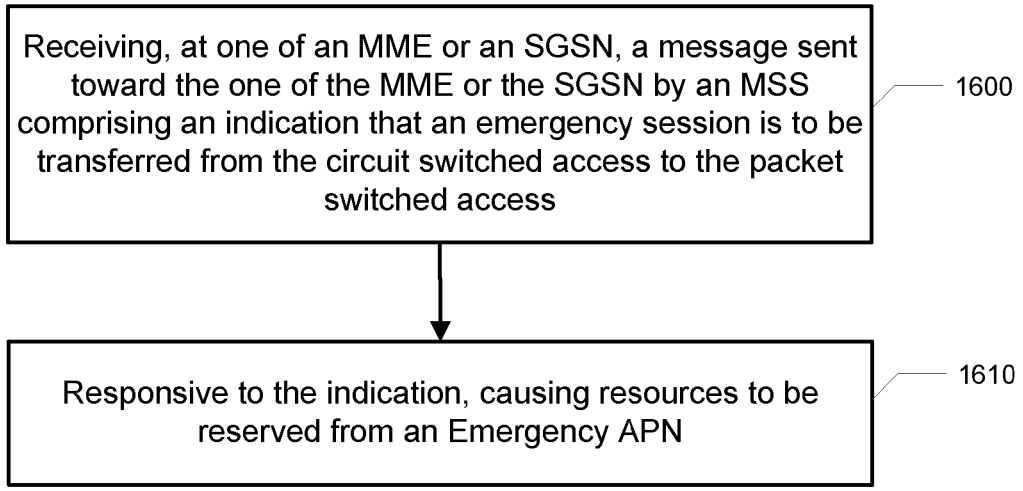

Having thus described example embodiments of the invention in general terms, reference will now be made to the accompanying drawings, which are not necessarily drawn to scale, and wherein:

FIG. 1 illustrates an example architecture for supporting reverse SRVCC handovers according to some example embodiments;

FIG. 2 illustrates an example architecture for supporting emergency sessions according to some example embodiments;

FIG. 3 is a schematic block diagram of a mobile terminal according to some example embodiments;

FIG. 4 illustrates a block diagram of a terminal apparatus according to some example embodiments;

FIG. 5 illustrates a block diagram of an EATF apparatus according to some example embodiments;

FIG. 6 illustrates a block diagram of an ATCF apparatus according to some example embodiments;

FIG. 7 illustrates a block diagram of an MSS apparatus according to some example embodiments;

FIG. 8 illustrates a block diagram of an MME/SGSN apparatus according to some example embodiments;

FIG. 9 illustrates a signaling diagram of signals that may be exchanged to facilitate continuity of an emergency session originated via a packet switched access in accordance with some example embodiments;

FIG. 10 illustrates phases of media path establishment during transfer of an emergency session in accordance with some example embodiments;

FIG. 11 illustrates a signaling diagram of signals that may be exchanged to facilitate continuity of an emergency session originated via a circuit switched access in accordance with some example embodiments;

FIG. 12 illustrates a flowchart according to an example method for facilitating communication session continuity according to some example embodiments;

FIG. 13 illustrates a flowchart according to another example method for facilitating communication session continuity according to some example embodiments;

FIG. 14 illustrates a flowchart according to a further example method for facilitating communication session continuity according to some example embodiments;

FIG. 15 illustrates a flowchart according to yet another example method for facilitating communication session continuity according to some example embodiments; and FIG. 16 illustrates a flowchart according to still a further example method for facilitating communication session continuity according to some example embodiments.

DETAILED DESCRIPTION

Some example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure. Further, where a computing device is described herein to receive data from or send data to another computing device, it will be appreciated that the data may be received or sent directly from the another computing device or may be received or sent indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Examples of non-transitory computer-readable media include a floppy disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, a random access memory (RAM), a programmable read only memory (PROM), an erasable programmable read only memory (EPROM), a FLASH-EPROM, any other memory chip or cartridge, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a diagram of an example architecture 100 for supporting reverse Single Radio Voice Call Continuity (SRVCC) according to some example embodiments. It will be appreciated that the system 100 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of an architecture for supporting reverse SRVCC, numerous other configurations may also be used to implement embodiments of the present invention.

The architecture 100 illustrates an example of an architecture that may be used to support a reverse SRVCC handover of a terminal, such as the user equipment (UE) 102, from a circuit switched (CS) access (e.g., the CS access 104) to a packet switched access. When the UE 102 is connected to and/or undergoing a reverse SRVCC handover to a packet switched access, the UE may communicate with a Proxy-Call Session Control Function (P-CSCF) 106 via an interface, such as the Gm interface 108. The P-CSCF 106 may be configured to interface with an Access Transfer Control Function (ATCF) via an interface 112, which may, for example comprise an Mw interface, Mx interface, and/or the like. While illustrated as separate entities in FIG. 1, in some example embodiments, the P-CSCF 106 and ATCF 110 may be co-located. The ATCF 110 may be further configured to interface with a Mobile Switching Center (MSC) server 114 via an interface 116, which may, for example, comprise an Mw interface, I2 interface, and/or the like. The type of interface used for the interface 116 may, for example, vary dependent upon the configuration of the MSC server 114. In some example embodiments, in an instance in which a reverse SRVCC (e.g., a handover of the UE 102 from the CS access 104 to a packet switched access) is performed, an I2 interface may be used for the interface 116. The MSC server 114 may be further configured to interface with the CS access 104.

In some example embodiments, the ATCF 110 may be additionally configured to interface with an (ATGW) 118 via an interface 120, which may, for example, comprise an Iq interface, Ix interface, and/or the like. In some example embodiments wherein the ATCF 110 is co-located with the P-CSCF 106, the interface 120 may comprise an Iq interface. In some example embodiments wherein the ATCF 110 may be co-located with an Interconnection Border Control Function (IBCF), the interface 120 may comprise an Ix interface.

The ATCF 110 may be further configured to interface with an Interrogating-Call Session Control Function and/or a Serving Call Session Control Function I/S-CSCF 122 via an interface 124, which may, for example, comprise an Mw interface, Mx interface, and/or the like. The I/S-CSCF 122 may additionally be configured to interface with a Service Centralization and Continuity Access Server (SCC AS) 126 via an interface 128, which may, for example, comprise an ISC (Internet Protocol Multimedia Subsystem (IMS) Service Control) interface.

FIG. 2 illustrates an example architecture 200 for supporting emergency sessions according to some example embodiments. In this regard, the architecture 200 illustrates an example architecture for supporting emergency sessions on a packet switched access. The architecture 200 may include a UE 102, which may be configured to interface with a P-CSCF 106 via an interface 108, as described in connection with the architecture 100 illustrated in FIG. 1. The architecture 200 may additionally comprise an S-CSCF 201, which may, for example, comprise an embodiment of the I/S-CSCF 122 illustrated in FIG. 1. The S-CSCF 201 may be configured to interface with the P-CSCF 106 via an interface 202, which may, for example, comprise an Mw interface. The S-CSCF 201 may additionally be configured to communicate with an Application Server (AS) via an interface 204, which may, for example, comprise an ISC interface, Mw interface, and/or the like. The S-CSCF 201 may be further configured to communicate with an entity that may be responsible for handling incoming emergency sessions, such as a Public Safety Answering Point (PSAP) and/or the like, via an interface 206. The interface 206 may, for example, comprise an Mm interface, Mx interface, Mw interface, and/or the like.

The architecture 200 may further comprise an Emergency-Call Session Control Function (E-CSCF) 208. The E-CSCF 208 may be configured to interface with the P-CSCF 106 via an interface 210, which may, for example, comprise an Mw interface and/or the like. The E-CSCF 208 may be further configured to interface with the S-CSCF 201 via an interface 212, which may, for example, comprise an Mw interface. The E-CSCF 208 may be additionally configured to interface to one or more entities that may be responsible for handling incoming emergency sessions, such as a PSAP, Emergency Call Server (ECS), and/or the like. For example, the E-CSCF 208 may be configured to interface with a PSAP, ECS, and/or the like via an interface 214 to an IBCF/IP multimedia network. The interface 214 may, for example, comprise an Mm interface, Mx interface, and/or the like. As a further example, the E-CSCF 208 may be configured to interface with a PSAP via an interface 216, such as via a Public Switched Telephone Network (PSTN), Breakout Gateway Control Function (BGCF), Media Gateway Control Function (MGCF), and/or the like. The interface 216 may, for example, comprise a Mi interface, Mg interface, and/or the like.

The architecture 200 may also comprise an Emergency Access Transfer Function (EATF) 218. The EATF 218 may be configured to interface with the E-CSCF 208 via an interface 220, which may, for example, comprise an I4 interface and/or the like. The EATF 218 may be further configured to interface with an I-CSCF via an interface 222, which may, for example, comprise an I5 interface.

The architecture 200 may additionally comprise a Location Retrieval Function (LRF) 234. The LRF 224 and E-CSCF 208 may be configured to interface with each other via an interface 226. The interface 226 may, for example, comprise an MI interface and/or the like. The LRF 234 may be further configured to interface with one or more entities that may be responsible for handling incoming emergency sessions, such as a PSAP, via the interface 228. The interface 228 may, for example, comprise an Le interface (e.g., an E2 interface) and/or the like.

It will be appreciated that the architecture 100 and architecture 200 are each provided by way of example, and not by way of limitation, as examples of architectures within which some example embodiments may be implemented. In this regard, it will be appreciated that some example embodiments may be implemented in architectures for supporting reverse SRVCC handovers that may have additional elements, alternative elements, omitted elements, and/or an alternative configuration of elements compared to the architecture 100 illustrated in FIG. 1. It will be further appreciated that some example embodiments may be implemented in architectures for supporting emergency sessions that may have additional elements, alternative elements, omitted elements, and/or an alternative configuration of elements compared to the architecture 200 illustrated in FIG. 2. As such, it will be appreciated that the UE 102 illustrated in FIGS. 1 and 2 may, in some example, embodiments, be implemented in the context of such alternative architectures.

Moreover, it will be appreciated that where specific types of circuit switched and/or packet switched access technologies are described, other types of circuit switched and/or packet switched access technologies may respectively be substituted for those described within the context of the disclosure. Thus, for example, where LTE technology is used as an example of a packet switched access, it will be appreciated that other types of packet switched access technologies may be substituted for LTE within the scope of the disclosure.

Some example embodiments provide for integration of an architecture for supporting reverse SRVCC handovers, such as the architecture 100, with an architecture for supporting emergency sessions, such as the architecture 200, so as to support continuity of an active emergency session during a reverse SRVCC handover. In accordance with some example embodiments, an emergency session may comprise, for example, placing a call to a designated emergency number that is recognized as an emergency session. In this regard, a call placed to the designated emergency number may be recognized as an emergency session by one or more network entities that may be configured to handle emergency sessions. By way of example, in the United States, the number 911 is a recognized emergency number that, when dialed, may initiate an emergency session.

The UE 102 may, for example, be configured to initiate and/or otherwise engage in an emergency session. In accordance with various example embodiments, the emergency session may be activated while the UE 102 is served by a packet switched access and/or while the UE 102 is served by a circuit switched access. The emergency session may be active while the UE 102 undergoes a reverse SRVCC handover from a circuit switched access (e.g., the CS access 104) to a packet switched access. Some example embodiments may accordingly be configured to facilitate continuity of an emergency session active during a reverse SRVCC handover of the UE 102 from a circuit switched access to a packet switched access.

The UE 102 may comprise any terminal device that may be configured to access a network(s), such as a public land mobile network (PLMN) and/or other cellular network, via both a packet switched network access and a circuit switched network access. By way of non-limiting example, the UE 102 may be embodied as a computer, laptop computer, mobile terminal, mobile computer, mobile phone, mobile communication device, tablet computing device, game device, digital camera/camcorder, audio/video player, television device, radio receiver, digital video recorder, positioning device, wrist watch, portable digital assistant (PDA), a chipset, an apparatus comprising a chipset, any combination thereof, and/or the like.

According to some example embodiments, the UE 102 may be embodied as a mobile terminal, such as that illustrated in FIG. 3. In this regard, FIG. 3 illustrates a block diagram of a mobile terminal 10 representative of some embodiments of a UE 102. It should be understood, however, that the mobile terminal 10 illustrated and hereinafter described is merely illustrative of one type of computing device that may implement and/or benefit from various embodiments and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 3 as a single processor, in some example embodiments the processor 20 may comprise a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (for example, digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). The mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display, a joystick, and/or other input device. In embodiments including a keypad, the keypad may comprise numeric (0-9) and related keys (#, *), and/or other keys for operating the mobile terminal.

As shown in FIG. 3, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (for example, Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. The mobile terminal may be capable of transmitting and/or receiving data from electronic devices according to various wireless networking techniques, including Wi-Fi, WLAN techniques such as IEEE 802.11 techniques, IEEE 802.15 techniques, IEEE 802.16 techniques, and/or the like.

The mobile terminal 10 may comprise memory, such as a removable or non-removable subscriber identity module (SIM) 38, a soft SIM 38, a fixed SIM 38, a removable or non-removable universal subscriber identity module (USIM) 38, a soft USIM 38, a fixed USIM 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40, non-volatile memory 42 may also include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Referring now to FIG. 4, FIG. 4 illustrates a block diagram of a terminal apparatus 402 according to some example embodiments. The terminal apparatus 402 may comprise an apparatus, which may be implemented on a terminal device, such as the UE 102, which may engage in an emergency session while undergoing a reverse SRVCC handover from a circuit switched access to a packet switched access in accordance with some example embodiments.

In some example embodiments, the terminal apparatus 402 may include various means for performing the various functions herein described. These means may comprise one or more of a processor 410, memory 412, communication interface 414, user interface 416, or emergency session continuity module 418. The means of the terminal apparatus 402 as described herein may be embodied as, for example, circuitry, hardware elements (for example, a suitably programmed processor, combinational logic circuit, and/or the like), a computer program product comprising a computer-readable medium (for example memory 412) storing computer-readable program instructions (for example, software or firmware) that are executable by a suitably configured processing device (for example, the processor 410), or some combination thereof.

In some example embodiments, one or more of the means illustrated in FIG. 4 may be embodied as a chip or chip set. In other words, the terminal apparatus 402 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 410, memory 412, communication interface 414, user interface 416, and/or emergency session continuity module 418 may be embodied as a chip or chip set. The terminal apparatus 402 may therefore, in some example embodiments, be configured to implement example embodiments of the present invention on a single chip or as a single "system on a chip." As another example, in some example embodiments, the terminal apparatus 402 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 410 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 4 as a single processor, in some example embodiments the processor 410 may comprise a plurality of processors. The plurality of processors may be in operative communication with each other and may be collectively configured to perform one or more functionalities of the terminal apparatus 402 as described herein. The plurality of processors may be embodied on a single computing device or distributed across a plurality of computing devices collectively configured to function as the terminal apparatus 402. In embodiments wherein the terminal apparatus 402 is embodied as a mobile terminal 10, the processor 410 may be embodied as or may comprise the processor 20. In some example embodiments, the processor 410 is configured to execute instructions stored in the memory 412 or otherwise accessible to the processor 410. These instructions, when executed by the processor 410, may cause the terminal apparatus 402 to perform one or more of the functionalities of the terminal apparatus 402 as described herein. As such, whether configured by hardware or software methods, or by a combination thereof, the processor 410 may comprise an entity capable of performing operations according to embodiments of the present invention while configured accordingly. Thus, for example, when the processor 410 is embodied as an ASIC, FPGA or the like, the processor 410 may comprise specifically configured hardware for conducting one or more operations described herein. Alternatively, as another example, when the processor 410 is embodied as an executor of instructions, such as may be stored in the memory 412, the instructions may specifically configure the processor 410 to perform one or more algorithms and operations described herein.

The memory 412 may comprise, for example, volatile memory, non-volatile memory, or some combination thereof. In this regard, the memory 412 may comprise a non-transitory computer-readable storage medium. Although illustrated in FIG. 4 as a single memory, the memory 412 may comprise a plurality of memories. The plurality of memories may be embodied on a single computing device or may be distributed across a plurality of computing devices collectively configured to function as the terminal apparatus 402. In various example embodiments, the memory 412 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the terminal apparatus 402 is embodied as a mobile terminal 10, the memory 412 may comprise the volatile memory 40 and/or the non-volatile memory 42. The memory 412 may be configured to store information, data, applications, instructions, or the like for enabling the terminal apparatus 402 to carry out various functions in accordance with various example embodiments. For example, in some example embodiments, the memory 412 may be configured to buffer input data for processing by the processor 410. Additionally or alternatively, the memory 412 may be configured to store program instructions for execution by the processor 410. The memory 412 may store information in the form of static and/or dynamic information. This stored information may be stored and/or used by the emergency session continuity module 418 during the course of performing its functionalities.

The communication interface 414 may be embodied as any device or means embodied in circuitry, hardware, a computer program product comprising a computer-readable medium (for example memory 412) storing computer-readable program instructions (for example, software or firmware) that are executable by a suitably configured processing device (for example, the processor 410), or a combination thereof that is configured to receive and/or transmit data from/to another computing device. According to some example embodiments, the communication interface 414 may be at least partially embodied as or otherwise controlled by the processor 410. In this regard, the communication interface 414 may be in communication with the processor 410, such as via a bus. The communication interface 414 may include, for example, an antenna, a transmitter, a receiver, a transceiver and/or supporting hardware or software for enabling communications with one or more computing devices. The communication interface 414 may be configured to receive and/or transmit data using any protocol that may be used for communications between computing devices. In this regard, the communication interface 414 may be configured to receive and/or transmit data using any protocol that may be used for transmission of data over a wireless network, wireline network, some combination thereof, or the like by which the terminal apparatus 402 and one or more further computing devices may be in communication. The communication interface 414 may additionally be in communication with the memory 412, user interface 416, and/or emergency session continuity module 418, such as via a bus(es). In some example embodiments, operation of the communication interface 414 may be at least partially controlled by the processor 410, memory 412, emergency session continuity module 418, or some combination thereof. Accordingly, in some example embodiments, the processor 410, memory 412, emergency session continuity module 418, or some combination thereof may be configured to cause the communication interface 416 and, by extension, the terminal apparatus 402 to send data to another computing device, such as over a network or other interface by which the terminal apparatus 402 and one or more other entities may be in communication.

The user interface 416 may be in communication with the processor 410 to receive an indication of a user input and/or to provide an audible, visual, mechanical, or other output to a user. As such, the user interface 416 may include, for example, a keyboard, a mouse, a joystick, a display, a touch screen display, a microphone, a speaker, and/or other input/output mechanisms. In embodiments wherein the user interface 416 comprises a touch screen display, the user interface 416 may additionally be configured to detect and/or receive an indication of a touch gesture or other input to the touch screen display. The user interface 416 may be in communication with the memory 412, communication interface 414, and/or emergency session continuity module 418, such as via a bus(es).

The emergency session continuity module 418 may be embodied as various means, such as circuitry, hardware, a computer program product comprising a computer-readable medium (for example memory 412) storing computer-readable program instructions (for example, software or firmware) that are executable by a suitably configured processing device (for example, the processor 410), or some combination thereof and, in some example embodiments, may be embodied as or otherwise controlled by the processor 410. In embodiments wherein the emergency session continuity module 418 is embodied separately from the processor 410, the emergency session continuity module 418 may be in communication with the processor 410. The emergency session continuity module 418 may further be in communication with one or more of the memory 412, communication interface 414, or user interface 416, such as via a bus(es).

FIG. 5 illustrates a block diagram of an Emergency Access Transfer Function (EATF) apparatus 502 according to some example embodiments. The EATF apparatus 502 may comprise an apparatus, which may be configured to implement and/or be implemented on an EATF entity, such as the EATF 218, in accordance with some example embodiments.

In some example embodiments, the EATF apparatus 502 may include various means for performing the various functions herein described. These means may comprise one or more of a processor 510, memory 512, communication interface 514, or EATF control module 518. The means of the EATF apparatus 502 as described herein may be embodied as, for example, circuitry, hardware elements (for example, a suitably programmed processor, combinational logic circuit, and/or the like), a computer program product comprising a computer-readable medium (for example memory 512) storing computer-readable program instructions (for example, software or firmware) that are executable by a suitably configured processing device (for example, the processor 510), or some combination thereof.

In some example embodiments, one or more of the means illustrated in FIG. 5 may be embodied as a chip or chip set. In other words, the EATF apparatus 502 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 510, memory 512, communication interface 514, and/or EATF control module 518 may be embodied as a chip or chip set. The EATF apparatus 502 may therefore, in some example embodiments, be configured to implement example embodiments of the present invention on a single chip or as a single "system on a chip." As another example, in some example embodiments, the EATF apparatus 502 may comprise component(s) configured to implement embodiments of the present invention on a single chip or as a single "system on a chip." As such, in some cases, a chip or chipset may constitute means for performing one or more operations for providing the functionalities described herein.

The processor 510 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 5 as a single processor, in some example embodiments the processor 510 may comprise a plurality of processors. The plurality of processors may be in operative communication with each other and may be collectively configured to perform one or more functionalities of the EATF apparatus 502 as described herein. The plurality of processors may be embodied on a single computing device or distributed across a plurality of computing devices collectively configured to function as the EATF apparatus 502. In some example embodiments, the processor 510 is configured to execute instructions stored in the memory 512 or otherwise accessible to the processor 510. These instructions, when executed by the processor 510, may cause the EATF apparatus 502 to perform one or more of the functionalities of the EATF apparatus 502 as described herein. As such, whether configured by hardware or software methods, or by a combination thereof, the processor 510 may comprise an entity capable of performing operations according to embodiments of the present invention while configured accordingly. Thus, for example, when the processor 510 is embodied as an ASIC, FPGA or the like, the processor 510 may comprise specifically configured hardware for conducting one or more operations described herein. Alternatively, as another example, when the processor 510 is embodied as an executor of instructions, such as may be stored in the memory 512, the instructions may specifically configure the processor 510 to perform one or more algorithms and operations described herein.

The memory 512 may comprise, for example, volatile memory, non-volatile memory, or some combination thereof. In this regard, the memory 512 may comprise a non-transitory computer-readable storage medium. Although illustrated in FIG. 5 as a single memory, the memory 512 may comprise a plurality of memories. The plurality of memories may be embodied on a single computing device or may be distributed across a plurality of computing devices collectively configured to function as the EATF apparatus 502. In various example embodiments, the memory 512 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 512 may be configured to store information, data, applications, instructions, or the like for enabling the EATF apparatus 502 to carry out various functions in accordance with various example embodiments. For example, in some example embodiments, the memory 512 may be configured to buffer input data for processing by the processor 510. Additionally or alternatively, the memory 512 may be configured to store program instructions for execution by the processor 510. The memory 512 may store information in the form of static and/or dynamic information. This stored information may be stored and/or used by the EATF control module 518 during the course of performing its functionalities.

The communication interface 514 may be embodied as any device or means embodied in circuitry, hardware, a computer program product comprising a computer-readable medium (for example memory 512) storing computer-readable program instructions (for example, software or firmware) that are executable by a suitably configured processing device (for example, the processor 510), or a combination thereof that is configured to receive and/or transmit data from/to another computing device. According to some example embodiments, the communication interface 514 may be at least partially embodied as or otherwise controlled by the processor 510. In this regard, the communication interface 514 may be in communication with the processor 510, such as via a bus. The communication interface 514 may include, for example, an antenna, a transmitter, a receiver, a transceiver and/or supporting hardware or software for enabling communications with one or more computing devices. The communication interface 514 may be configured to receive and/or transmit data using any protocol that may be used for communications between computing devices. In this regard, the communication interface 514 may be configured to receive and/or transmit data using any protocol that may be used for transmission of data over a wireless network, wireline network, some combination thereof, or the like by which the EATF apparatus 502 and one or more further computing devices may be in communication. The communication interface 514 may additionally be in communication with the memory 512, and/or EATF control module 518, such as via a bus(es). In some example embodiments, operation of the communication interface 514 may be at least partially controlled by the processor 510, memory 512, EATF control module 518, or some combination thereof. Accordingly, in some example embodiments, the processor 510, memory 512, EATF control module 518, or some combination thereof may be configured to cause the communication interface 514 and, by extension, the EATF apparatus 502 to send data to another computing device, such as over a network or other interface by which the EATF apparatus 502 and one or more other entities may be in communication.

The EATF control module 518 may be embodied as various means, such as circuitry, hardware, a computer program product comprising a computer-readable medium (for example memory 512) storing computer-readable program instructions (for example, software or firmware) that are executable by a suitably configured processing device (for example, the processor 510), or some combination thereof and, in some example embodiments, may be embodied as or otherwise controlled by the processor 510. In embodiments wherein the EATF control module 518 is embodied separately from the processor 510, the EATF control module 518 may be in communication with the processor 510. The EATF control module 518 may further be in communication with one or more of the memory 512, or communication interface 514, such as via a bus(es).

FIG. 6 illustrates a block diagram of an Access Transfer Control Function (ATCF) apparatus 602 according to some example embodiments. The ATCF apparatus 602 may comprise an apparatus, which may be configured to implement and/or be implemented on an ATCF entity, such as the ATCF 110, in accordance with some example embodiments.

In some example embodiments, the ATCF apparatus 602 may include various means for performing the various functions herein described. These means may comprise one or more of a processor 610, memory 612, communication interface 614, or ATCF control module 618. The means of the ATCF apparatus 602 as described herein may be embodied as, for example, circuitry, hardware elements (for example, a suitably programmed processor, combinational logic circuit, and/or the like), a computer program product comprising a computer-readable medium (for example memory 612) storing computer-readable program instructions (for example, software or firmware) that are executable by a suitably configured processing device (for example, the processor 610), or some combination thereof.

In some example embodiments, one or more of the means illustrated in FIG. 6 may be embodied as a chip or chip set. In other words, the ATCF apparatus 602 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 610, memory 612, communication interface 614, and/or ATCF control module 618 may be embodied as a chip or chip set. The ATCF apparatus 602 may therefore, in some example embodiments, be configured to implement example embodiments of the present invention on a single chip or as a single "system on a chip." As another example, in some example embodiments, the ATCF apparatus 602 may comprise component(s) configured to implement embodiments of the present invention on a single chip or as a single "system on a chip." As such, in some cases, a chip or chipset may constitute means for performing one or more operations for providing the functionalities described herein.

The processor 610 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 6 as a single processor, in some example embodiments the processor 610 may comprise a plurality of processors. The plurality of processors may be in operative communication with each other and may be collectively configured to perform one or more functionalities of the ATCF apparatus 602 as described herein. The plurality of processors may be embodied on a single computing device or distributed across a plurality of computing devices collectively configured to function as the ATCF apparatus 602. In some example embodiments, the processor 610 is configured to execute instructions stored in the memory 612 or otherwise accessible to the processor 610. These instructions, when executed by the processor 610, may cause the ATCF apparatus 602 to perform one or more of the functionalities of the ATCF apparatus 602 as described herein. As such, whether configured by hardware or software methods, or by a combination thereof, the processor 610 may comprise an entity capable of performing operations according to embodiments of the present invention while configured accordingly. Thus, for example, when the processor 610 is embodied as an ASIC, FPGA or the like, the processor 610 may comprise specifically configured hardware for conducting one or more operations described herein. Alternatively, as another example, when the processor 610 is embodied as an executor of instructions, such as may be stored in the memory 612, the instructions may specifically configure the processor 610 to perform one or more algorithms and operations described herein.

The memory 612 may comprise, for example, volatile memory, non-volatile memory, or some combination thereof. In this regard, the memory 612 may comprise a non-transitory computer-readable storage medium. Although illustrated in FIG. 6 as a single memory, the memory 612 may comprise a plurality of memories. The plurality of memories may be embodied on a single computing device or may be distributed across a plurality of computing devices collectively configured to function as the ATCF apparatus 602. In various example embodiments, the memory 612 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 612 may be configured to store information, data, applications, instructions, or the like for enabling the ATCF apparatus 602 to carry out various functions in accordance with various example embodiments. For example, in some example embodiments, the memory 612 may be configured to buffer input data for processing by the processor 610. Additionally or alternatively, the memory 612 may be configured to store program instructions for execution by the processor 610. The memory 612 may store information in the form of static and/or dynamic information. This stored information may be stored and/or used by the ATCF control module 618 during the course of performing its functionalities.

The communication interface 614 may be embodied as any device or means embodied in circuitry, hardware, a computer program product comprising a computer-readable medium (for example memory 612) storing computer-readable program instructions (for example, software or firmware) that are executable by a suitably configured processing device (for example, the processor 610), or a combination thereof that is configured to receive and/or transmit data from/to another computing device. According to some example embodiments, the communication interface 614 may be at least partially embodied as or otherwise controlled by the processor 610. In this regard, the communication interface 614 may be in communication with the processor 610, such as via a bus. The communication interface 614 may include, for example, an antenna, a transmitter, a receiver, a transceiver and/or supporting hardware or software for enabling communications with one or more computing devices. The communication interface 614 may be configured to receive and/or transmit data using any protocol that may be used for communications between computing devices. In this regard, the communication interface 614 may be configured to receive and/or transmit data using any protocol that may be used for transmission of data over a wireless network, wireline network, some combination thereof, or the like by which the ATCF apparatus 602 and one or more further computing devices may be in communication. The communication interface 614 may additionally be in communication with the memory 612, and/or ATCF control module 618, such as via a bus(es). In some example embodiments, operation of the communication interface 614 may be at least partially controlled by the processor 610, memory 612, ATCF control module 618, or some combination thereof. Accordingly, in some example embodiments, the processor 610, memory 612, ATCF control module 618, or some combination thereof may be configured to cause the communication interface 614 and, by extension, the ATCF apparatus 602 to send data to another computing device, such as over a network or other interface by which the ATCF apparatus 602 and one or more other entities may be in communication.

The ATCF control module 618 may be embodied as various means, such as circuitry, hardware, a computer program product comprising a computer-readable medium (for example memory 612) storing computer-readable program instructions (for example, software or firmware) that are executable by a suitably configured processing device (for example, the processor 610), or some combination thereof and, in some example embodiments, may be embodied as or otherwise controlled by the processor 610. In embodiments wherein the ATCF control module 618 is embodied separately from the processor 610, the ATCF control module 618 may be in communication with the processor 610. The ATCF control module 618 may further be in communication with one or more of the memory 612, or communication interface 614, such as via a bus(es).

FIG. 7 illustrates a block diagram of a Mobile Switching Center Server (MSS) apparatus 702 according to some example embodiments. The MSS apparatus 702 may comprise an apparatus, which may be configured to implement and/or be implemented on an MSS entity, such as the MSC Server 114, in accordance with some example embodiments.

In some example embodiments, the MSS apparatus 702 may include various means for performing the various functions herein described. These means may comprise one or more of a processor 710, memory 712, communication interface 714, or MSS control module 718. The means of the MSS apparatus 702 as described herein may be embodied as, for example, circuitry, hardware elements (for example, a suitably programmed processor, combinational logic circuit, and/or the like), a computer program product comprising a computer-readable medium (for example memory 712) storing computer-readable program instructions (for example, software or firmware) that are executable by a suitably configured processing device (for example, the processor 710), or some combination thereof.

In some example embodiments, one or more of the means illustrated in FIG. 7 may be embodied as a chip or chip set. In other words, the MSS apparatus 702 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 710, memory 712, communication interface 714, and/or MSS control module 718 may be embodied as a chip or chip set. The MSS apparatus 702 may therefore, in some example embodiments, be configured to implement example embodiments of the present invention on a single chip or as a single "system on a chip." As another example, in some example embodiments, the MSS apparatus 702 may comprise component(s) configured to implement embodiments of the present invention on a single chip or as a single "system on a chip." As such, in some cases, a chip or chipset may constitute means for performing one or more operations for providing the functionalities described herein.

The processor 710 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 7 as a single processor, in some example embodiments the processor 710 may comprise a plurality of processors. The plurality of processors may be in operative communication with each other and may be collectively configured to perform one or more functionalities of the MSS apparatus 702 as described herein. The plurality of processors may be embodied on a single computing device or distributed across a plurality of computing devices collectively configured to function as the MSS apparatus 702. In some example embodiments, the processor 710 is configured to execute instructions stored in the memory 712 or otherwise accessible to the processor 710. These instructions, when executed by the processor 710, may cause the MSS apparatus 702 to perform one or more of the functionalities of the MSS apparatus 702 as described herein. As such, whether configured by hardware or software methods, or by a combination thereof, the processor 710 may comprise an entity capable of performing operations according to embodiments of the present invention while configured accordingly. Thus, for example, when the processor 710 is embodied as an ASIC, FPGA or the like, the processor 710 may comprise specifically configured hardware for conducting one or more operations described herein. Alternatively, as another example, when the processor 710 is embodied as an executor of instructions, such as may be stored in the memory 712, the instructions may specifically configure the processor 710 to perform one or more algorithms and operations described herein.

The memory 712 may comprise, for example, volatile memory, non-volatile memory, or some combination thereof. In this regard, the memory 712 may comprise a non-transitory computer-readable storage medium. Although illustrated in FIG. 7 as a single memory, the memory 712 may comprise a plurality of memories. The plurality of memories may be embodied on a single computing device or may be distributed across a plurality of computing devices collectively configured to function as the MSS apparatus 702. In various example embodiments, the memory 712 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 712 may be configured to store information, data, applications, instructions, or the like for enabling the MSS apparatus 702 to carry out various functions in accordance with various example embodiments. For example, in some example embodiments, the memory 712 may be configured to buffer input data for processing by the processor 710. Additionally or alternatively, the memory 712 may be configured to store program instructions for execution by the processor 710. The memory 712 may store information in the form of static and/or dynamic information. This stored information may be stored and/or used by the MSS control module 718 during the course of performing its functionalities.

The communication interface 714 may be embodied as any device or means embodied in circuitry, hardware, a computer program product comprising a computer-readable medium (for example memory 712) storing computer-readable program instructions (for example, software or firmware) that are executable by a suitably configured processing device (for example, the processor 710), or a combination thereof that is configured to receive and/or transmit data from/to another computing device. According to some example embodiments, the communication interface 714 may be at least partially embodied as or otherwise controlled by the processor 710. In this regard, the communication interface 714 may be in communication with the processor 710, such as via a bus. The communication interface 714 may include, for example, an antenna, a transmitter, a receiver, a transceiver and/or supporting hardware or software for enabling communications with one or more computing devices. The communication interface 714 may be configured to receive and/or transmit data using any protocol that may be used for communications between computing devices. In this regard, the communication interface 714 may be configured to receive and/or transmit data using any protocol that may be used for transmission of data over a wireless network, wireline network, some combination thereof, or the like by which the MSS apparatus 702 and one or more further computing devices may be in communication. The communication interface 714 may additionally be in communication with the memory 712, and/or MSS control module 718, such as via a bus(es). In some example embodiments, operation of the communication interface 714 may be at least partially controlled by the processor 710, memory 712, MSS control module 718, or some combination thereof. Accordingly, in some example embodiments, the processor 710, memory 712, MSS control module 718, or some combination thereof may be configured to cause the communication interface 714 and, by extension, the MSS apparatus 702 to send data to another computing device, such as over a network or other interface by which the MSS apparatus 702 and one or more other entities may be in communication.

The MSS control module 718 may be embodied as various means, such as circuitry, hardware, a computer program product comprising a computer-readable medium (for example memory 712) storing computer-readable program instructions (for example, software or firmware) that are executable by a suitably configured processing device (for example, the processor 710), or some combination thereof and, in some example embodiments, may be embodied as or otherwise controlled by the processor 710. In embodiments wherein the MSS control module 718 is embodied separately from the processor 710, the MSS control module 718 may be in communication with the processor 710. The MSS control module 718 may further be in communication with one or more of the memory 712, or communication interface 714, such as via a bus(es).

FIG. 8 illustrates a block diagram of a Mobility Management Entity/Serving General Packet Radio Service Support Node (MME/SGSN) apparatus 802 according to some example embodiments. The MME/SGSN apparatus 802 may comprise an apparatus, which may be configured to implement and/or be implemented on a mobility management entity (MME) and/or a serving general packet radio service support node (SGSN) in accordance with some example embodiments. In some example embodiments, the MSS apparatus 702 and MME/SGSN apparatus 802 may be configured to interface with each other, such as via an Sv interface. In this regard, in some example embodiments, the MME/SGSN apparatus 802 may be configured to interface with an MSS entity, such as the MSC server 114 illustrated in FIG. 1, such as via an Sv interface.

In some example embodiments, the MME/SGSN apparatus 802 may include various means for performing the various functions herein described. These means may comprise one or more of a processor 810, memory 812, communication interface 814, or MME/SGSN control module 818. The means of the MME/SGSN apparatus 802 as described herein may be embodied as, for example, circuitry, hardware elements (for example, a suitably programmed processor, combinational logic circuit, and/or the like), a computer program product comprising a computer-readable medium (for example memory 812) storing computer-readable program instructions (for example, software or firmware) that are executable by a suitably configured processing device (for example, the processor 810), or some combination thereof.

In some example embodiments, one or more of the means illustrated in FIG. 8 may be embodied as a chip or chip set. In other words, the MME/SGSN apparatus 802 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 810, memory 812, communication interface 814, and/or MME/SGSN control module 818 may be embodied as a chip or chip set. The MME/SGSN apparatus 802 may therefore, in some example embodiments, be configured to implement example embodiments of the present invention on a single chip or as a single "system on a chip." As another example, in some example embodiments, the MME/SGSN apparatus 802 may comprise component(s) configured to implement embodiments of the present invention on a single chip or as a single "system on a chip." As such, in some cases, a chip or chipset may constitute means for performing one or more operations for providing the functionalities described herein.

The processor 810 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 8 as a single processor, in some example embodiments the processor 810 may comprise a plurality of processors. The plurality of processors may be in operative communication with each other and may be collectively configured to perform one or more functionalities of the MME/SGSN apparatus 802 as described herein. The plurality of processors may be embodied on a single computing device or distributed across a plurality of computing devices collectively configured to function as the MME/SGSN apparatus 802. In some example embodiments, the processor 810 is configured to execute instructions stored in the memory 812 or otherwise accessible to the processor 810. These instructions, when executed by the processor 810, may cause the MME/SGSN apparatus 802 to perform one or more of the functionalities of the MME/SGSN apparatus 802 as described herein. As such, whether configured by hardware or software methods, or by a combination thereof, the processor 810 may comprise an entity capable of performing operations according to embodiments of the present invention while configured accordingly. Thus, for example, when the processor 810 is embodied as an ASIC, FPGA or the like, the processor 810 may comprise specifically configured hardware for conducting one or more operations described herein. Alternatively, as another example, when the processor 810 is embodied as an executor of instructions, such as may be stored in the memory 812, the instructions may specifically configure the processor 810 to perform one or more algorithms and operations described herein.

The memory 812 may comprise, for example, volatile memory, non-volatile memory, or some combination thereof. In this regard, the memory 812 may comprise a non-transitory computer-readable storage medium. Although illustrated in FIG. 8 as a single memory, the memory 812 may comprise a plurality of memories. The plurality of memories may be embodied on a single computing device or may be distributed across a plurality of computing devices collectively configured to function as the MME/SGSN apparatus 802. In various example embodiments, the memory 812 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 812 may be configured to store information, data, applications, instructions, or the like for enabling the MME/SGSN apparatus 802 to carry out various functions in accordance with various example embodiments. For example, in some example embodiments, the memory 812 may be configured to buffer input data for processing by the processor 810. Additionally or alternatively, the memory 812 may be configured to store program instructions for execution by the processor 810. The memory 812 may store information in the form of static and/or dynamic information. This stored information may be stored and/or used by the MME/SGSN control module 818 during the course of performing its functionalities.

The communication interface 814 may be embodied as any device or means embodied in circuitry, hardware, a computer program product comprising a computer-readable medium (for example memory 812) storing computer-readable program instructions (for example, software or firmware) that are executable by a suitably configured processing device (for example, the processor 810), or a combination thereof that is configured to receive and/or transmit data from/to another computing device. According to some example embodiments, the communication interface 814 may be at least partially embodied as or otherwise controlled by the processor 810. In this regard, the communication interface 814 may be in communication with the processor 810, such as via a bus. The communication interface 814 may include, for example, an antenna, a transmitter, a receiver, a transceiver and/or supporting hardware or software for enabling communications with one or more computing devices. The communication interface 814 may be configured to receive and/or transmit data using any protocol that may be used for communications between computing devices. In this regard, the communication interface 814 may be configured to receive and/or transmit data using any protocol that may be used for transmission of data over a wireless network, wireline network, some combination thereof, or the like by which the MME/SGSN apparatus 802 and one or more further computing devices may be in communication. The communication interface 814 may additionally be in communication with the memory 812, and/or MME/SGSN control module 818, such as via a bus(es). In some example embodiments, operation of the communication interface 814 may be at least partially controlled by the processor 810, memory 812, MME/SGSN control module 818, or some combination thereof. Accordingly, in some example embodiments, the processor 810, memory 812, MME/SGSN control module 818, or some combination thereof may be configured to cause the communication interface 814 and, by extension, the MME/SGSN apparatus 802 to send data to another computing device, such as over a network or other interface by which the MME/SGSN apparatus 802 and one or more other entities may be in communication.

The MME/SGSN control module 818 may be embodied as various means, such as circuitry, hardware, a computer program product comprising a computer-readable medium (for example memory 812) storing computer-readable program instructions (for example, software or firmware) that are executable by a suitably configured processing device (for example, the processor 810), or some combination thereof and, in some example embodiments, may be embodied as or otherwise controlled by the processor 810. In embodiments wherein the MME/SGSN control module 818 is embodied separately from the processor 810, the MME/SGSN control module 818 may be in communication with the processor 810. The MME/SGSN control module 818 may further be in communication with one or more of the memory 812, or communication interface 814, such as via a bus(es).

In order to facilitate continuity of an emergency session during a reverse SRVCC handover, some example embodiments introduce an identifier associated with an EATF (e.g., the EATF 218, EATF apparatus 502, and/or the like) that may be serving the terminal undergoing the handover. This identifier is referred to in some example embodiments described herein as an Emergency Session Transfer Identifier for Circuit Switched to Packet Switched SRVCC (E-STI-SR). The identifier may be usable by a terminal apparatus 402 to set up an emergency session transfer request to the EATF to cause creation of a bearer for the emergency session on the packet switched access following a reverse SRVCC handover of the terminal apparatus. The identifier may further be route an emergency session transfer request from the terminal apparatus 402 to the EATF, which may be configured to coordinate transfer of the emergency session from the circuit switched access to the packet switched access. In this regard, the identifier may uniquely identify the EATF that may be responsible for serving the terminal such that an emergency session transfer request originated by the terminal may be routed to the correct EATF.

Accordingly, in some example embodiments, some of which will be described in further detail herein below, a terminal apparatus 402 may be provided with an identifier associated with an EATF. In an instance in which the terminal apparatus 402 undergoes a reverse SRVCC handover with an active emergency session, the emergency session continuity module 418 may be configured to determine that the terminal apparatus 402 has undergone the reverse SRVCC handover from the circuit switched access to the packet switched access while engaged in the active emergency session.

The emergency session continuity module 418 may be further configured, responsive to this determination to use the previously received identifier associated with the EATF to set up an emergency session transfer request, such as a Session Transfer Complete request, to the EATF to move control of the session to the packet switched access and cause creation of a bearer for the emergency session on the packet switched access. The emergency session transfer request may include an indication of the identifier to enable the emergency session transfer request to be routed to the EATF. In this regard, for example, the identifier associated with the EATF may be included as a parameter in the emergency session transfer request. The emergency session transfer request may further comprise an identifier that may be associated with the terminal apparatus 402. For example, an instance ID (identification) of the terminal may be included in the emergency session transfer request to enable the EATF to correlate the transfer request to the anchored emergency session(s) based on the instance ID. The emergency session transfer request may, for example, comprise a session initiation protocol (SIP) message, such as a SIP INVITE message, which may be used to cause establishment of a SIP session with the EATF to create the bearer for the emergency session. The bearer for the emergency session may, for example, comprise a voice bearer for the emergency session, such as a QCI-1 (Quality of Service Class Identifier=1) voice bearer.

The emergency session continuity module 418 may be further configured to cause the emergency session transfer request to be sent toward the EATF to cause creation of the bearer for the emergency session on the packet switched access. In some example embodiments, the emergency session transfer request may be sent from the terminal apparatus 402 to a P-CSCF as an intermediate hop. In such example embodiments, the P-CSCF may be configured to forward the emergency session transfer request to the EATF.

The EATF control module 518 may be configured in some example embodiments to receive, at an EATF apparatus 502, an emergency session transfer request (e.g., a Session Transfer Complete request) that was originated by a terminal that has undergone a reverse SRVCC handover while engaged in an active emergency session. In some example embodiments wherein an identifier associated with the EATF is included in the emergency session transfer request, the emergency session transfer request may be routed to the EATF apparatus 502 based at least in part on the identifier. The emergency session transfer request may be received from the terminal apparatus or from an intermediate network node, such as a P-CSCF.

The EATF control module 518 may be further configured to coordinate transfer of the emergency session from the circuit switched access to the packet switched access based at least in part on the emergency session transfer request. In this regard, the EATF control module 518 may be configured in some example embodiments to determine an identity of the terminal originating the request and coordinate transfer of the emergency session(s) associated with the terminal from the circuit switched access to the packet switched access. For example, in some example embodiments wherein the session transfer request includes an identifier associated with the terminal sending the request, such as an instance ID of the terminal, the EATF control module 518 may be configured to use the identifier associated with the terminal to correlate the transfer request to the anchored session(s) associated with the identifier (e.g., the anchored session(s) associated with the instance ID of the terminal). In coordinating transfer of the emergency session from the circuit switched access to the packet switched access, the EATF control module 518 may be configured to cause creation of a bearer for the emergency session on the packet switched access. As previously noted, the bearer may, for example, comprise a voice bearer, such as a QCI-1 voice bearer. In some example embodiments, the EATF control module 518 may be configured to cause establishment of a SIP session responsive to the emergency session transfer request in order to create the bearer for the emergency session. The EATF control module 518 may be further configured to release the source access leg of the emergency session toward the MSS. In some example embodiments, the EATF control module 518 may be configured to cause the EATF to send a Session Transfer Complete response toward the terminal following coordination of transfer of the emergency session from the circuit switched access to the packet switched access to indicate that transfer of the session has been completed.

The terminal apparatus 402 may be provisioned with the identifier associated with the EATF in a variety of ways in accordance with various example embodiments. In some example embodiments, if the emergency session is originated via a packet switched access, the EATF control module 518 may be configured to cause the EATF apparatus 502 to provide the identifier to the terminal apparatus 402 during setup of the emergency session. For example, the identifier may be included as a parameter to an INVITE dialog that may be exchanged between the EATF and terminal during Internet Protocol Multimedia Subsystem (IMS) emergency session setup.

As an alternative, in some example embodiments, the identifier may be provided to the terminal apparatus 402 by the ATCF during IMS registration. In some such example embodiments, the terminal apparatus 402 may be provisioned with the identifier (E-STI-SR) by the ATCF during IMS registration regardless of whether the emergency session was originated via a packet switched access or via a circuit switched access. In this regard, the ATCF control module 618 of some example embodiments may be configured to cause the ATCF to send the identifier toward the terminal apparatus 402 during IMS registration. In such example embodiments, the ATCF may be preconfigured (e.g., by the EATF) with an address associated with the EATF based at least in part on a user identity that may be associated with the terminal 402. The address associated with the EATF may comprise the identifier, E-STI-SR. The user identity may, for example, comprise a Correlation-Mobile Subscriber Integrated Services Digital Network Number (C-MSISDN) that may be associated with a terminal apparatus 402 of some example embodiments. In some example embodiments, the ATCF control module 618 may be configured to cause the ATCF to maintain a mapping, such as in the memory 612, between the address associated with the EATF and the user identity associated with the terminal. The ATCF control module 618 may accordingly be configured in some such example embodiments to determine the E-STI-SR that is to be provided to the terminal apparatus 402 based at least in part on the mapping.

As still a further alternative, in some example embodiments, in an instance in which the emergency session was originated via a circuit switched access, the identifier may be provided to the terminal apparatus 402 by the MSS during setup of an emergency session. The MSS control module 718 of such example embodiments may accordingly be configured to cause the MSS to send the identifier toward the terminal apparatus 102 during setup of an emergency session. The identifier in such example embodiments may initially be provided to the MSS by the EATF. In this regard, for example, the EATF control module 518 may be configured to cause the identifier to be sent toward the MSS, such as during setup of the emergency session. The MSS control module 718 may receive the identifier and may, in turn, cause the MSS to send the identifier toward the terminal apparatus 402, such as in a Call Conf message, call alert NAS (Non Access Stratum) message, and/or the like that may be sent toward the terminal during setup of an emergency session.

Having now described how a terminal may be provisioned with an identifier associated with an EATF, as well as how the identifier may be used to facilitate continuity of an emergency session in accordance with some example embodiments, more particular examples of reverse SRVCC procedures involving emergency sessions in accordance with some example embodiments will now be described in the context of FIGS. 9-11. Referring first to FIG. 9, FIG. 9 illustrates a signaling diagram of signals that may be exchanged to facilitate continuity of an emergency session originated via a packet switched access in accordance with some example embodiments. More particularly, FIG. 9 illustrates an example flow of operations that may be performed by and signals that may be exchanged between a UE 902, P-CSCF/ATCF 904, P-CSCF/E-CSCF 906, EATF 908, MME/SGSN 910, and an MSS/Media Gateway (MGW) 912.

The UE 902 may, for example, comprise an embodiment of the UE 102. In some example embodiments, a terminal apparatus 402 may be implemented on the UE 902. As such, operations illustrated and described to be performed by the UE 902 may be performed by, with the assistance of, and/or under the control of one or more of the processor 410, memory 412, communication interface 414, or emergency session continuity module 418.

The P-CSCF/ATCF 904 may, for example, comprise an embodiment of the P-CSCF 106 and/or the ATCF 110. In some example embodiments, an ATCF apparatus 602 may be implemented on the P-CSCF/ATCF 904. As such, operations illustrated and described to be performed by the P-CSCF/ATCF 904 may be performed by, with the assistance of, and/or under the control of one or more of the processor 610, memory 612, communication interface 614, or ATCF control module 618. The P-CSCF/E-CSCF 906 may, for example, comprise an embodiment of the P-CSCF 106 and/or the E-CSCF 208.

The EATF 908 may, for example, comprise an embodiment of the EATF 218. In some example embodiments, an EATF apparatus 502 may be implemented on the EATF 908. As such, operations illustrated and described to be performed by the EATF 908 may be performed by, with the assistance of, and/or under the control of one or more of the processor 510, memory 512, communication interface 514, or EATF control module 518.

The MME/SGSN 910 may, for example, comprise an MME and/or an SGSN. In some example embodiments, an MME/SGSN apparatus 802 may be implemented on the MME/SGSN 910. As such, operations illustrated and described to be performed by the MME/SGSN 910 may be performed by, with the assistance of, and/or under the control of one or more of the processor 810, memory 812, communication interface 814, or MME/SGSN control module 818.

The MSS/MGW 912 may, for example, comprise an embodiment of the MSC server 114. In some example embodiments, an MSS apparatus 702 may be implemented on the MSS/MGW 912. As such, operations illustrated and described to be performed by the MSS/MGW 912 may be performed by, with the assistance of, and/or under the control of one or more of the processor 710, memory 712, communication interface 714, or MSS control module 718.

The UE 902 may be on a packet switched access, such as an LTE access. Operation 920 may comprise the UE 902 performing IMS registration to the P-CSCF/ATCF 904, such as via the Gm interface 108. The IMS registration may, for example, be performed in accordance with TS 23.237. The UE 902 may provide information supporting reverse SRVCC to the ATCF during the IMS registration procedure of operation 920. The information supporting reverse SRVCC may, for example, comprise a codec(s) and an uplink (UL) media port number(s) that may be associated with the UE 902.

In embodiments in which the E-STI-SR is provided to the UE 902 by the ATCF during IMS registration, operation 920 may further comprise the P-CSCF/ATCF 904 sending the E-STI-SR toward the UE 902. In such example embodiments, the ATCF may be preconfigured with the address of the EATF 908 based on a user identity, such as C-MSISDN, that may be associated with the UE 902. In some such example embodiments, the ATCF may accordingly determine the E-STI-SR to provide to the UE 902 based at least in part on a mapping that may be maintained by the ATCF between the address of the EATF 908 and a user identity that may be associated with the UE 902.

A user may initiate an emergency session, such as by placing an emergency call. Operation 925 may occur responsive to the user initiating the emergency session. In this regard, operation 925 may comprise the UE 902 initiating an IMS emergency registration and session. Initiation of the IMS emergency session may comprise the UE 925 performing emergency bearer action. Emergency bearer activation may, for example, be performed in accordance with the procedure performed in TS 23.401. An emergency INVITE message may be sent to the P-CSCF/E-CSCF 906 and/or EATF 908 to start a session and support an emergency SRVCC procedure, such as in accordance with the procedure defined in TS 23.237 and TS 23.216. Following completion of operation 925, the IMS signalling path may be routed between the UE 902-P-CSCF-E-CSCF-EATF then toward the emergency center (e.g., a PSAP). In some instances, the signalling path may be routed toward the emergency center via IP Multimedia Subsystem Media Gateway (IM MGW).

In embodiments wherein the E-STI-SR is not provided to the UE 902 during operation 920, operation 930 may comprise the EATF 908 sending the E-STI-SR toward the UE 902. However, in embodiments in which the E-STI-SR is provided to the UE 902 by the ATCF in operation 920, operation 930 may be omitted.

The UE 902 may move outside of the coverage area of the packet switched access coverage, such as out of LTE/HSPA (High Speed Packet Access) coverage. Responsive to the mobility of the UE 902, operation 935 may comprise performance of an emergency SRVCC handover of the UE 902 to a circuit switched access. The emergency SRVCC handover may, for example, be performed in accordance with the procedures defined in TS 23.216 and TS 23.237. For example, the MME/SGSN 910 may indicate to the MSC Server (e.g., the MSS/MGW 912) that an emergency SRVCC is to be performed. The MSC Server may perform a domain transfer with the EATF 908 using a locally configured E-STN-SR (Emergency Session Transfer Number for SRVCC).

As illustrated in operation 940, the UE 902 may be handed over to a circuit switched radio access technology (RAT) following the emergency SRVCC. After the UE 902 has been handed over to the circuit switched access, the MSS 912 may perform an I2 registration if it has not been done previously. The SCC AS may return a Uniform Resource Identifier (URI) that identifies an ATCF (e.g., ATCF-URI) to the MSS 912.

Following the SRVCC, the UE 902 may again enter a coverage area of a packet switched access. The MSS 912 may determine, at operation 945, that a reverse SRVCC handover of the UE 902, while the UE 902 is engaged in the emergency session, is required. Responsive to this determination, a session transfer notification exchange may be performed between the MSS 912 and ATCF 904. In this regard, the MSS 912 may query the ATCF 904 to retrieve reverse SRVCC information for the UE 902 to support the reverse SRVCC. The reverse SRVCC information may, for example, comprise a codec list for packet switched media for the UE 902, downlink (DL) media port number (s) for the UE 902, and/or the like. The MSS/MGW 912 may use the reverse SRVCC information obtained from the ATCF 904 to determine and reserve an uplink (UL) port number(s) and IP address of the IM MGW, packet switched media codec, and/or the like for the emergency session with the MGW, at operation 955.

Operation 960 may comprise the MSS 912 formatting and sending a circuit switched to packet switched (CS to PS) handover (HO) request message toward the MME/SGSN 910. The message may comprise an indication that an emergency session is to be transferred from the circuit switched access to the packet switched access. For example, in the example of FIG. 9, an "emer" parameter may be included in the message.

The MME/SGSN 910 may receive the message sent by the MSS 912 at operation 960. Operation 965 may comprise the MME/SGSN 910, responsive to the indication included in the message that the emergency session is to be transferred from the circuit switched access to the packet switched access, reserve resources from an emergency access point name (APN) rather than from a regular IMS APN. In this regard, the MME/SGSN 910 may, for example, reserve bearer resources (e.g., an evolved Node B bearer resource) using a higher priority by setting ARP (Allocation and Retention Priority parameter) designated for use with an emergency bearer.

Operation 970 may comprise the MME/SGSN 910 sending a CS to PS handover response including a handover command (HO CMD) toward the MSS 912. Operation 975 may comprise the MSS 912 sending a handover command toward the UE 902. The handover command may include an indication of the UL IP/port#, packet switched media codec, and/or the like that may have been reserved at operation 905. When the MSS 912 receives a handover complete message from the MME/SGSN 910, the MSS 912 may switch the media toward the UE 902's IP/port # on the DL direction. The UE 902 may also start sending UL traffic to the designated IP and port # given by the MSS 910 in the HO CMD. Following operation 975 and prior to operation 985, voice media between the UE 902 and MSC/MGW 912 may use the IMS signalling bearer, such as QCI-5.

As illustrated by operation 980, the UE 902 may have completed handover to the packet switched radio access technology (PS RAT) following operation 975. Operation 985 may comprise the UE 902 setting up an emergency session transfer request to the EATF 908. The emergency session transfer request may, for example, comprise a SIP INVITE message. The UE 902 may use the E-STI-SR that it previously received (e.g., in operation 920 or in operation 930) to set up the emergency session transfer request. For example, the E-STI-SR may be included as a parameter in a SIP INVITE message. Operation 985 may further comprise the UE 902 sending the emergency session transfer request toward the P-CSCF, which may forward it to the EATF 908 based at least in part on the E-STN-SR in the request URI (R-URI) in the SIP protocol. During the emergency session transfer, the P-CSCF may setup the voice bearer (e.g., QCI-1), such as via a Policy Charging Rules Function (PCRF) for voice media. The UE 902 may indicate a new port in a Session Description Protocol (SDP) offer. The P-CSCF may have a list of preconfigured E-STN-SR addresses to enable the P-CSCF to determine that the E-STN-SR is a valid destination for an IMS session transfer using the Emergency APN. The EATF 908 may then switch the media path directly between UE 902 and other endpoints. The EATF 908 may also release the call leg toward the MSS 912.

FIG. 10 illustrates phases of media path establishment during transfer of an emergency session in accordance with some example embodiments. In this regard, FIG. 10 illustrates phases of media path establishment during transfer of an emergency session from an LTE packet switched access to a circuit switched access, and back to LTE packet switched access, such as described with respect to FIG. 9. Following establishment of the emergency session via the LTE packet switched access (e.g., following completion of operation 925), the media bearer path may extend from the UE 902, to a packet data network gateway (PGW) 904, and then to an IP Multimedia Subsystem Media Gateway (IM MGW) and/or a PSAP end point 1006, as illustrated by the media bearer path 1010. After completion of an SRVCC from the LTE packet switched access to a circuit switched access (e.g., following completion of operation 940), the media bearer path may extend from the UE 902, to the MSS/MGW 912, and then to the IM MGW and/or PSAP end point 1006, as illustrated by the media bearer path 1020. After performance of the reverse SRVCC and establishment of the bearer QCI-5 (e.g., following completion of operation 980), the media bearer path may extend from the UE 902, to the PDW 1004, to the MSS/MGW 912, and then to the IM MGW and/or PSAP end point 10006, as illustrated by the media bearer path 1030. Following establishment of the bearer QCI-1 (e.g., following completion of operation 985), the media bearer path may extend from the UE 902, to the PGW 1004, and then to the IM MGW and/or PSAP end point 1006, as illustrated by the media bearer path 1040.

FIG. 11 illustrates a signaling diagram of signals that may be exchanged to facilitate continuity of an emergency session originated via a circuit switched access in accordance with some example embodiments. More particularly, FIG. 11 illustrates an example flow of operations that may be performed by and signals that may be exchanged between a UE 1102, P-CSCF/ATCF 1104, MSS/MGW 1106, EATF 1108, and an MME/SGSN 1110.

The UE 1102 may, for example, comprise an embodiment of the UE 102. In some example embodiments, a terminal apparatus 402 may be implemented on the UE 1102. As such, operations illustrated and described to be performed by the UE 1102 may be performed by, with the assistance of, and/or under the control of one or more of the processor 410, memory 412, communication interface 414, or emergency session continuity module 418.

The P-CSCF/ATCF 1104 may, for example, comprise an embodiment of the P-CSCF 106 and/or the ATCF 110. In some example embodiments, an ATCF apparatus 602 may be implemented on the P-CSCF/ATCF 1104. As such, operations illustrated and described to be performed by the P-CSCF/ATCF 1104 may be performed by, with the assistance of, and/or under the control of one or more of the processor 610, memory 612, communication interface 614, or ATCF control module 618.

The MSS/MGW 1106 may, for example, comprise an embodiment of the MSC server 114. In some example embodiments, an MSS apparatus 702 may be implemented on the MSS/MGW 1106. As such, operations illustrated and described to be performed by the MSS/MGW 1106 may be performed by, with the assistance of, and/or under the control of one or more of the processor 710, memory 712, communication interface 714, or MSS control module 718.

The EATF 1108 may, for example, comprise an embodiment of the EATF 218. In some example embodiments, an EATF apparatus 502 may be implemented on the EATF 1108. As such, operations illustrated and described to be performed by the EATF 1108 may be performed by, with the assistance of, and/or under the control of one or more of the processor 510, memory 512, communication interface 514, or EATF control module 518.

The MME/SGSN 1110 may, for example, comprise an MME and/or an SGSN. In some example embodiments, an MME/SGSN apparatus 802 may be implemented on the MME/SGSN 1110. As such, operations illustrated and described to be performed by the MME/SGSN 1110 may be performed by, with the assistance of, and/or under the control of one or more of the processor 810, memory 812, communication interface 814, or MME/SGSN control module 818.

The UE 1102 may be within the coverage range of a circuit switched access. Operation 1120 may comprise the UE 1102 performing IMS registration to the P-CSCF/ATCF 1104, such as via the Gm interface 108. The IMS registration may, for example, be performed in accordance with TS 23.237. The UE 902 may provide information supporting reverse SRVCC to the ATCF during the IMS registration procedure of operation 1120. The information supporting reverse SRVCC may, for example, comprise a codec(s) and an uplink (UL) media port number(s) that may be associated with the UE 1102.

In embodiments in which the E-STI-SR is provided to the UE 1102 by the ATCF during IMS registration, operation 1120 may further comprise the P-CSCF/ATCF 1104 sending the E-STI-SR toward the UE 1102. In such example embodiments, the ATCF may be preconfigured with the address of the EATF 1108 based on a user identity, such as C-MSISDN, that may be associated with the UE 102. In some such example embodiments, the ATCF may accordingly determine the E-STI-SR to provide to the UE 1102 based at least in part on a mapping that may be maintained by the ATCF between the address of the EATF 1108 and a user identity that may be associated with the UE 1102.

Operation 1125 may comprise the UE 1102 performing a circuit switched attach procedure and IMS Centralized Services ICS I2 registration with the MSS/MGW 1106. The UE 1102 may additionally receive an ATCF-URI from the SCC AS.

A user may initiate an emergency session, such as by placing an emergency call. Operation 1130 may occur responsive to the user initiating the emergency session. In this regard, operation 1130 may comprise the UE 902 initiating an emergency session setup procedure, such as an E911 setup.

The MSS/MGW 1106 may receive the emergency setup communication originated by the UE 1102. Operation 1135 may comprise the MSS 1106 setting the R-URI to the PSAP address in response to the emergency session setup procedure. The MSS 1106 may use its own locally configured E-STN-SR to route the emergency session to the EATF 1108. In this regard, the MSS 1106 may send a message, such as a SIP INVITE message, toward the EATF 1108 that may include the E-STN-SR of the MSS 1106. The MSS 1106 may additionally include an indication that the emergency session is a circuit switched session in the message. For example, the MSS 1106 may include a "CS Session" indicator as a parameter in a SIP INVITE message. The EATF 1108 may receive the message originated by the MSS 1106 and, in response to the indication that the emergency session is a circuit switched session, may continue to route the session toward the PSAP, as illustrated in operation 1140. The EATF 1108 may be configured in some example embodiments to continue to route the session toward the PSAP based on IMS procedure. In some example embodiments, the EATF 1108 may be able to distinguish the circuit switched emergency session from packet switched emergency sessions. In this regard, the EATF 1108 may be configured to use the indication that the emergency session is a circuit switched session (e.g., the CS Session indicator) to distinguish a request for reverse SRVCC of the emergency session from a session transfer request from the MSS 1106 for packet switched to circuit switched single radio voice call continuity of a session or an emergency call setup procedure.

In embodiments wherein the E-STI-SR is not provided to the UE 1102 during operation 1120, operations 1145 and 1150 may be performed. However, in embodiments in which the E-STI-SR is provided to the UE 1102 by the ATCF in operation 1120, operations 1145 and 1150 may be omitted. Operation 1145 may comprise the EATF 1108 sending an indication of the E-STI-SR toward the MSS 1106. Operation 1145 may, for example, be performed during setup of the emergency session. The MSS 1106 may receive the indication of the identifier sent by the MSS 1106 and may, in turn, send an indication of the E-STI-SR toward the UE 1102. For example, the MSS 1106 may include an indication of the E-STI-SR in a Call Conf, message, call alert message, or the like.

If a reverse SRVCC handover of the UE 1102 is performed while the emergency session is still active, it may follow the procedure illustrated in and described with respect to operations 945-985 of FIG. 9. However, in the example of FIG. 11, the UE 1102 may not have a connection to the Emergency APN. In this regard, in the example of FIG. 11, the UE 1102 may only have a connection to a regular IMS APN. As such, in the example of FIG. 11, in an instance in which the evolved Node B (eNB) resources for voice media, the eNB may reserve the resources from the regular IMS APN. However, the eNB may use the emergency ARP as an indicator to upgrade the ARP of the signalling bearer from regular to emergency.

Some example embodiments may additionally facilitate continuity of an emergency session during a reverse SRVCC handover of a terminal from a circuit switched access to a packet switched access even if the emergency session is not associated with a Uniform Integrated Circuit Card (UICC), such as in an instance in which the terminal does not have a UICC. In this regard, a normal IMS registration may not be performed if a terminal does not have a UICC (e.g., when the terminal does not have any UICC, does not have a valid UICC, or the like). As such, in some example embodiments, in an instance in which a terminal does not have a UICC, the emergency session continuity module 418 that may be associated with the terminal may be configured to cause the terminal to provide information supporting a reverse SRVCC to a network entity prior to performance of the reverse SRVCC, such as during setup of an emergency session. The information supporting the reverse SRVCC may, for example, comprise a downlink packet switched media port number(s) that may be associated with the terminal, a codec list that may be associated with the terminal, and/or the like. The network entity to which the terminal may provide the information supporting reverse SRVCC may, for example, comprise an MSS or an EATF. For example, if an emergency session is originated via a circuit switched access, the terminal may provide information supporting reverse SRVCC to the MSS during emergency call setup (e.g., in operation 1130 illustrated in FIG. 11). Alternatively, for example, if an emergency session is originated via a packet switched access, the terminal may provide information supporting reverse SRVCC to the EATF, such as during operation 925 illustrated in FIG. 9. The MSS may query the EATF for the information supporting reverse SRVCC when needed, such as in operation 950 illustrated in FIG. 9.

FIG. 12 illustrates a flowchart according to an example method for facilitating communication session continuity according to some example embodiments. In this regard, FIG. 12 illustrates operations that may be performed at a terminal apparatus 402. The operations illustrated in and described with respect to FIG. 12 may, for example, be performed by, with the assistance of, and/or under the control of one or more of the processor 410, memory 412, communication interface 414, user interface 416, or emergency session continuity module 418. Operation 1200 may comprise receiving, at a terminal, an identifier associated with an EATF. The processor 410, memory 412, communication interface 414, and/or emergency session continuity module 418 may, for example, provide means for performing operation 1200. Operation 1210 may comprise determining that the terminal has undergone a reverse SRVCC handover from a circuit switched access to a packet switched access while engaged in an active emergency session. The processor 410, memory 412, communication interface 414, and/or emergency session continuity module 418 may, for example, provide means for performing operation 1210. Operation 1220 may comprise, responsive to the determination of operation 1210, using the identifier to set up an emergency session transfer request to the EATF to cause creation of a bearer for the emergency session on the packet switched access. The processor 410, memory 412, communication interface 414, and/or emergency session continuity module 418 may, for example, provide means for performing operation 1220.

FIG. 13 illustrates a flowchart according to another example method for facilitating communication session continuity according to some example embodiments. In this regard, FIG. 13 illustrates operations that may be performed at an EATF apparatus 502. The operations illustrated in and described with respect to FIG. 13 may, for example, be performed by, with the assistance of, and/or under the control of one or more of the processor 510, memory 512, communication interface 514, or EATF control module 518. Operation 1300 may comprise subsequent to a terminal undergoing a reverse SRVCC handover from a circuit switched access to a packet switched access while engaged in an active emergency session, receiving, at an EATF, an emergency session transfer request originated by the terminal. The emergency session transfer request may comprise an indication of an identifier associated with the EATF. The processor 510, memory 512, communication interface 514, and/or EATF control module 518 may, for example, provide means for performing operation 1300. Operation 1310 may comprise coordinating transfer of the emergency session from the circuit switched access to the packet switched access based at least in part on the emergency session transfer request. For example, in some example embodiments wherein the emergency session transfer request comprises an identifier associated with the terminal originating the emergency session transfer request, such as an instance ID of the terminal, operation 1310 may comprise using the identifier associated with the terminal to correlate the transfer request to the anchored session(s) associated with the identifier and coordinate transfer of the session(s) associated with the identifier. The processor 510, memory 512, communication interface 514, and/or EATF control module 518 may, for example, provide means for performing operation 1310.

FIG. 14 illustrates a flowchart according to a further example method for facilitating communication session continuity according to some example embodiments. In this regard, FIG. 14 illustrates operations that may be performed at an ATCF apparatus 602. The operations illustrated in and described with respect to FIG. 14 may, for example, be performed by, with the assistance of, and/or under the control of one or more of the processor 610, memory 612, communication interface 614, or ATCF control module 618. Operation 1400 may comprise determining, at an ATCF, an identifier associated with an EATF. The processor 610, memory 612, communication interface 614, and/or ATCF control module 618 may, for example, provide means for performing operation 1400. Operation 1410 may comprise causing the determined identifier to be sent from the ATCF toward a terminal. In an instance in which the terminal undergoes a reverse SRVCC (handover from a circuit switched access to a packet switched access while engaged in an active emergency session, the identifier may be usable by the terminal to setup an emergency session transfer request to the EATF to cause creation of a bearer for the emergency session on the packet switched access. The processor 610, memory 612, communication interface 614, and/or ATCF control module 618 may, for example, provide means for performing operation 1410.

FIG. 15 illustrates a flowchart according to yet another example method for facilitating communication session continuity according to some example embodiments. In this regard, FIG. 15 illustrates operations that may be performed at an MSS apparatus 702. The operations illustrated in and described with respect to FIG. 15 may, for example, be performed by, with the assistance of, and/or under the control of one or more of the processor 710, memory 712, communication interface 714, or MSS control module 718. Operation 1500 may comprise determining, at an MSS, that a reverse SRVCC handover of a terminal from a circuit switched access to a packet switched access while the terminal is engaged in an active emergency session has been triggered. The processor 710, memory 712, communication interface 714, and/or MSS control module 718 may, for example, provide means for performing operation 1500. Operation 1510 may comprise, responsive to the determination of operation 1500, formatting a message to one of an MME or an SGSN. The message may comprise an indication that an emergency session is to be transferred from the circuit switched access to the packet switched access. The processor 710, memory 712, communication interface 714, and/or MSS control module 718 may, for example, provide means for performing operation 1510.

FIG. 16 illustrates a flowchart according to still a further example method for facilitating communication session continuity according to some example embodiments. In this regard, FIG. 16 illustrates operations that may be performed at an MME/SGSN apparatus 802. The operations illustrated in and described with respect to FIG. 16 may, for example, be performed by, with the assistance of, and/or under the control of one or more of the processor 810, memory 812, communication interface 814, or MME/SGSN control module 818. Operation 1600 may comprise receiving, at one of an MME or an SGSN, a message sent toward the one of the MME or the SGSN by an MSS comprising an indication that an emergency session is to be transferred from the circuit switched access to the packet switched access. The processor 810, memory 812, communication interface 814, and/or MME/SGSN control module 818 may, for example, provide means for performing operation 1600. Operation 1610 may comprise responsive to the indication, causing resources to be reserved from an Emergency APN. The processor 810, memory 812, communication interface 814, and/or MME/SGSN control module 818 may, for example, provide means for performing operation 1610.

FIGS. 12-16 each illustrate a flowchart of a system, method, and computer program product according to some example embodiments. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 412, 512, 612, 712, and/or 812) and executed by a processor in the computing device (for example, by the processor 410, 510, 610, 710, and/or 810). In some example embodiments, the computer program instructions comprising the computer program product(s) which embody the procedures described above may be stored by memory devices of a plurality of computing devices. As will be appreciated, any such computer program product may be loaded onto a computer or other programmable apparatus (for example, a terminal apparatus 402, EATF apparatus 502, ATCF apparatus 602, MSS apparatus 702, and/or MME/SGSN apparatus 802 and/or other apparatus) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus (for example, a terminal apparatus 402, EATF apparatus 502, ATCF apparatus 602, MSS apparatus 702, and/or MME/SGSN apparatus 802 and/or other apparatus) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. According to some example embodiments, a suitably configured processor (for example, the processor 410, 510, 610, 710, and/or 810) may provide all or a portion of the elements. In other example embodiments, all or a portion of the elements may be configured by and operate under control of a computer program product. The computer program product for performing the methods of some example embodiments may include a computer-readable storage medium (for example, the memory 412, 512, 612, 712, and/or 812), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
    receiving, at a terminal, an identifier associated with an emergency access transfer function;
    determining that the terminal has undergone a reverse single radio voice call continuity handover from a circuit switched access to a packet switched access while engaged in an active emergency session; and
    responsive to the determination, using the identifier to set up an emergency session transfer request to the emergency access transfer function to cause creation of a bearer for the emergency session on the packet switched access,
    wherein the identifier comprises an identifier based at least in part on a mapping between an address associated with the emergency access transfer function and a user identity associated with the terminal, wherein the mapping is maintained by the access transfer control function.

2. The method of claim 1, further comprising causing the emergency session transfer request to be sent to cause establishment of a session initiation protocol session to create the bearer for the emergency session.

3. The method of claim 1, wherein the emergency session was originated via packet switched access.

4. The method of claim 1, wherein the emergency session was originated via circuit switched access.

5. The method of claim 1, wherein the emergency session was originated via the circuit switched access, and wherein receiving the identifier associated with the emergency access transfer function comprises receiving an identifier sent toward the terminal by a mobile switching center server during setup of the emergency session.

6. The method of claim 1, wherein the emergency session was originated via packet switched access, and wherein receiving the identifier associated with the emergency access transfer function comprises receiving an identifier sent toward the terminal by the emergency access transfer function during setup of the emergency session.

7. The method of claim 1, wherein the emergency session comprises an emergency session that is not associated with a uniform integrated circuit card.

8. The method of claim 1, wherein the information supporting the reverse single radio voice call continuity comprises one or more of a downlink packet switched media port number or a codec list associated with the terminal.

9. The method of claim 1, further comprising causing the terminal to provide information supporting the reverse single radio voice call continuity to a network entity prior to performance of the reverse single radio voice call continuity.

10. An apparatus comprising at least one processor and at least one memory storing computer program code, wherein the at least one memory and stored computer program code are configured, with the at least one processor, to cause the apparatus to at least:
    receive an identifier associated with an emergency access transfer function;
    determine that the apparatus has undergone a reverse single radio voice call continuity handover from a circuit switched access to a packet switched access while engaged in an active emergency session; and
    responsive to the determination, use the identifier to set up an emergency session transfer request to the emergency access transfer function to cause creation of a bearer for the emergency session on the packet switched access,
    wherein the identifier comprises an identifier based at least in part on a mapping between an address associated with the emergency access transfer function and a user identity associated with the apparatus, wherein the mapping is maintained by the access transfer control function.

11. The apparatus of claim 10, wherein the at least one memory and stored computer program code are configured, with the at least one processor, to further cause the apparatus to cause the emergency session transfer request to be sent to cause establishment of a session initiation protocol session to create the bearer for the emergency session.

12. The apparatus of claim 10, wherein the emergency session was originated via packet switched access.

13. The apparatus of claim 10, wherein the emergency session was originated via circuit switched access.

14. The apparatus of claim 10, wherein the emergency session was originated via the circuit switched access, and wherein the at least one memory and stored computer program code are configured, with the at least one processor, to further cause the apparatus to receive the identifier associated with the emergency access transfer function at least in part by receiving an identifier sent toward the apparatus by a mobile switching center server during setup of the emergency session.

15. The apparatus of claim 10, wherein the emergency session was originated via packet switched access, and wherein the at least one memory and stored computer program code are configured, with the at least one processor, to further cause the apparatus to receive the identifier associated with the emergency access transfer function at least in part by receiving an identifier sent toward the apparatus by the emergency access transfer function during setup of the emergency session.

16. The apparatus of claim 10, wherein the emergency session comprises an emergency session that is not associated with a uniform integrated circuit card.

17. The apparatus of claim 10, wherein the information supporting the reverse single radio voice call continuity comprises one or more of a downlink packet switched media port number or a codec list associated with the apparatus.

18. The apparatus of claim 10, wherein the at least one memory and stored computer program code are configured, with the at least one processor, to further cause the apparatus to cause information supporting the reverse single radio voice call continuity to be provided to a network entity prior to performance of the reverse single radio voice call continuity.

19. A method comprising:
receiving, at a terminal, an identifier associated with an emergency access transfer function;
determining that the terminal has undergone a reverse single radio voice call continuity handover from a circuit switched access to a packet switched access while engaged in an active emergency session; and
responsive to the determination, using the identifier to set up an emergency session transfer request to the emergency access transfer function to cause creation of a bearer for the emergency session on the packet switched access, wherein receiving the identifier associated with the emergency access transfer function comprises receiving an identifier sent toward the terminal by an access transfer control function during internet protocol multimedia subsystem registration, and the identifier comprises an identifier based at least in part on a mapping between an address associated with the emergency access transfer function and a user identity associated with the terminal, wherein the mapping is maintained by the access transfer control function.

20. An apparatus comprising at least one processor and at least one memory storing computer program code, wherein the at least one memory and stored computer program code are configured, with the at least one processor, to cause the apparatus to at least:
receive an identifier associated with an emergency access transfer function;
determine that the apparatus has undergone a reverse single radio voice call continuity handover from a circuit switched access to a packet switched access while engaged in an active emergency session; and
responsive to the determination, use the identifier to set up an emergency session transfer request to the emergency access transfer function to cause creation of a bearer for the emergency session on the packet switched access, wherein receiving the identifier associated with the emergency access transfer function comprises receiving an identifier sent toward the terminal by an access transfer control function during internet protocol multimedia subsystem registration, and the identifier comprises an identifier based at least in part on a mapping between an address associated with the emergency access transfer function and a user identity associated with the terminal, wherein the mapping is maintained by the access transfer control function.

\* \* \* \* \*